United States Patent [19]

Mansfield et al.

[11] Patent Number: 5,839,635
[45] Date of Patent: Nov. 24, 1998

[54] CURVED-ANGLE CLEAVING OF OPTICAL FIBERS

[75] Inventors: Charles M. Mansfield; Gordon Wiegand; Martin G. Afflerbaugh; Suzanne T. Zochowski, all of Austin, Tex.

[73] Assignee: Minnesota Mining and Manufacturing Company, St. Paul, Minn.

[21] Appl. No.: 734,794

[22] Filed: Oct. 23, 1996

Related U.S. Application Data

[63] Continuation of Ser. No. 213,974, Mar. 15, 1994, abandoned.

[51] Int. Cl.⁶ .................................................. C03B 37/16
[52] U.S. Cl. .......................... 225/96.5; 225/105; 65/433
[58] Field of Search ........................... 225/95, 96.5, 97, 225/103, 105; 65/433

[56] References Cited

U.S. PATENT DOCUMENTS

| | | | |
|---|---|---|---|
| 3,934,773 | 1/1976 | Chimmock et al. | 225/2 |
| 4,027,814 | 6/1977 | Gloge et al. | 225/104 |
| 4,203,539 | 5/1980 | Miller | 225/96.5 X |
| 4,256,246 | 3/1981 | Kindel | 225/96.5 X |
| 4,456,159 | 6/1984 | Roberts et al. | 225/96.5 |
| 4,463,886 | 8/1984 | Thornton | 225/96.5 |
| 4,607,775 | 8/1986 | Krause | 225/96.5 |
| 4,790,465 | 12/1988 | Fellows et al. | 225/2 |
| 4,831,784 | 5/1989 | Takahashi | 451/288 |
| 5,024,363 | 6/1991 | Suda et al. | 225/96.005 |
| 5,048,908 | 9/1991 | Blonder et al. | 385/39 |
| 5,106,006 | 4/1992 | Suda et al. | 225/2 |

(List continued on next page.)

FOREIGN PATENT DOCUMENTS

| | | |
|---|---|---|
| 2077146 | 8/1992 | Canada . |
| 0 419 669 | 4/1991 | European Pat. Off. . |
| 0 579 521 | 1/1994 | European Pat. Off. . |
| 92 04891 | 4/1993 | France . |
| 1-121805 | 5/1989 | Japan . |

OTHER PUBLICATIONS

Alcatel, Alcatel 4018 Multifunction Fiber Cleaver, Nov. 1992.
Bellcore, Generic Requirements for Optical Fiber Cleaving Tools, Technical Advisory TA–NWT–000264, Issue 2, Dec. 1992.
Field et al., Cleavage of optical fibres following diamond–wedge indentation, *Philosophical Magazine A.*, 57(2):151–171, 1988.
Haibara et al., Design and Development of an Automatic Cutting Tool for Optical Fibers, *Journal of Lightwave Technology*, LT–4(4):1434–1439, Sep. 1986.

(List continued on next page.)

*Primary Examiner*—Maurina T. Rachuba
*Attorney, Agent, or Firm*—Arnold, White & Durkee

[57] ABSTRACT

A method and apparatus for curved-angle cleaving of optical fibers. The method requires the introduction of a flaw in an optical fiber to be cleaved, and the application of predetermined stress and strain to the optical fiber in the vicinity of the flaw to cause curved-angle cleaving of the optical fiber at the flaw. The apparatus of the present invention includes first and second pairs of optical fiber clamps separated by first predetermined distance, a flaw-producing device that produces a flaw in a fiber clamped between the clamps, and a force-applying device that applies a substantially concentrated force to the fiber at a second predetermined distance from the first pair of clamps, the flaw-producing device being located between the force-applying device and the second pair of optical fiber clamps at third predetermined distance from the force-applying device. The first, second and third predetermined distances are selected in order produce a curved-angle cleave in the optical fiber. Also presented is a conversion kit which is useable to convert an existing square-angle optical fiber cleaver into a curved-angle optical fiber cleaver. Finally, a curved-angle end-face of an optical fiber is disclosed that results from operating the apparatus of the present invention, in accordance with the method of the present invention.

3 Claims, 15 Drawing Sheets

U.S. PATENT DOCUMENTS

| | | | |
|---|---|---|---|
| 5,123,581 | 6/1992 | Curtis et al. | 225/2 |
| 5,125,549 | 6/1992 | Blackman et al. | 225/105 X |
| 5,129,567 | 7/1992 | Suda et al. | 225/96.5 |
| 5,140,660 | 8/1992 | Takahashi | 385/79 |
| 5,214,730 | 5/1993 | Nagasawa et al. | 385/59 |
| 5,245,684 | 9/1993 | Terao et al. | 385/78 |
| 5,312,468 | 5/1994 | Yin et al. | 65/433 |
| 5,382,276 | 1/1995 | Hakoun et al. | 65/433 |

OTHER PUBLICATIONS

Bellcore, *Generic Requirements Bulletin*, Dec. 1993.

Matsumoto et al., A Simple and Practical Cutting Tool for Optical Fiber End Preparation, *The Transactions of The IECE of Japan*, E 66(11):661–665, Nov. 1983.

CURVED-ANGLE CLEAVING OF OPTICAL FIBERS

This is a continuation of application Ser. No. 08/213,974 filed Mar. 15, 1994, now abandoned.

BACKGROUND OF THE INVENTION

The present invention relates to curved-angle cleaving of optical fibers, and in one aspect to a curved-angle end-face on an optical fiber and a method and apparatus for cleaving optical fibers to obtain curved-angle end-faces.

Often, optical fibers used in telecommunications must be spliced together when constructing communication networks. The fibers are typically spliced by one of two methods: mechanical splicing or fusion splicing. In either case, it is important that the ends of the fibers be properly prepared before splicing them.

The most desirable way to prepare the fiber ends for splicing is to cleave them with a good-quality optical fiber cleaver. Many cleavers have been developed and commercialized to accomplish this goal. When using fusion splicing, the optical fibers are actually melted (fused) together. In fusion splicing, the cleaved fiber ends are required to be smooth and square, or a poor splice will result. Therefore, most prior cleavers are designed to produce a cleaved end that is very square (i.e., substantially perpendicular to the fiber axis), and that has a very smooth, mirror-like finish.

One known method for producing a smooth, square cleave is described by U.S. Pat. No. 4,027,814, which discloses a method of applying a bending stress and tensile stress to an optical fiber, and then introducing a scratch, nick or "flaw" into the glass surface to create a square cleave.

Another method of square cleaving is performed by the Fujikura CT-OX series of cleavers, which are disclosed in U.S. Pat. No. 5,024,363. This cleaver produces square cleaves with a mirror finish. The Fujikura cleaver operates by first creating a scratch or flaw in the fiber, and then by applying a bending load to the fiber. The bending load applied to the fiber produces tensile stress at the location of the flaw, without shear, resulting in a square cleave.

When using mechanical splices to join fibers, the squareness of the cleaved end-face of the fibers is not as critical. This is because the splices use a grease-like material that has an index of refraction closely matched to the fiber, thus allowing slight physical separation between the fiber endfaces. Further, in many instances, it is actually desirable for the cleaved fiber endface to have an oblique angle, for example in the range of from 30° to 12°. This "angled" cleave has the benefits of reducing reflected light at the splice (called back reflection or return loss). Due to higher digital transmission rates, and due to analog signals now being carried on optical fibers, reducing the back reflection has increased in importance. Therefore, there is now strong interest in developing optical fiber cleavers that are capable of producing high-quality cleaves with angled end-faces.

FIG. 1A is an optical fiber 11 with a square end-face 12, and FIG. 1B is an optical fiber 11 with an angled end-face 13. In FIG. 1A, angle a is typically 90°±1°, and angle b in FIG. 1B is typically within the range of from 3° to 12°.

FIG. 1C is an end view of a cleaved optical fiber 11, including the cladding 16 and core 14. For single mode optical fiber, the diameter of optical fiber 11 is typically 125 microns, and the diameter of core 14 is typically 8.3 microns.

While angled cleaves reduce reflected light thus reducing reflection or return loss, splices made with angled cleaves typically have a higher insertion loss than splices made with square cleaves. This is due primarily to longitudinal separation between cores of spliced fibers. Insertion loss is discussed in more detail below with reference to FIGS. 8A–D.

One known method of producing angled cleaves is to create an appropriate combination of shear and tensile stress in the optical fiber, and to introduce a flaw (such as a nick or scratch) in the fiber to begin the cleaving process. One such method of producing a shear stress is to provide a torsional strain (twist) on the fiber, as disclosed in U.S. Pat. No. 5,048,908. Two cleavers are now being marketed (one by York Technology Inc. and the other by Alcatel Telecommunications Cable), that operate on this principle. These cleavers provide cleave angles in the range of from 6° to 12°, but suffer from three disadvantages: they are expensive, and they are capable of cleaving only single fibers, not optical fiber ribbon, and the cleavers do not produce a curved end-face. The angled end-face produced by these cleavers have a slightly non-planar helical surface.

Another method for producing a combination of tensile and shear stresses for cleaving an optical fiber is described in U.S. Pat. No. 5,123,581. This cleaver operates by directly applying a longitudinal tensile load in combination with a radial compressive load to the optical fiber, which in turn produces the required tensile and shear stresses in the fiber. The shear stress is concentrated in a very short region of the fiber at the point where a scratch or flaw is created during application of the radial compressive load, in order to induce the cleave. When the induced flaw is sufficiently large, a crack propagates across the fiber at an angle, creating a smooth, angled cleave.

FIG. 2A is an isometric view of the cleaver of U.S. Pat. No. 5,123,581, and includes a first fixed clamp 17 that clamps a first portion of optical fiber 11, and a second spring loaded clamp 18 that clamps a second portion of optical fiber 11, and that produces a longitudinal tensile load in fiber 11. The device also includes a supporting anvil 19, and a scoring wheel 21. In operation, the fiber is clamped into clamps 17 and 18, and the supporting anvil 19 is fixed rigidly against fiber 11, so that it lightly contacts and supports fiber 11, but produces only enough bending in fiber 11 to ensure contact. The bending stress is minimal. Finally, the scoring wheel 21 is moved against the fiber 11, while the supporting anvil 19 also contacts the fiber. As the scoring wheel 21 is pressed into the fiber 11, a shear stress is created by the compressive forces produced by scoring wheel 21 and anvil 19, due to a slight longitudinal offset between them. As the scoring wheel 21 is advanced further, the size of the flaw and shear stress both increase until a crack propagates across the fiber 11, creating an angled cleave. FIG. 2B is a magnified view of the device in FIG. 2A, showing the cooperation between supporting anvil 19 and scoring wheel 21 to produce an angled cleave in optical fiber 11 along cleave line 22. The longitudinal offset between wheel 21 and anvil 19 is approximately 40 microns.

FIG. 2C is a free-body diagram of the forces exerted on fiber 11 by the apparatus of FIG. 2A during cleaving. $T_A$ is the applied tensile force, $F_A$ are the applied compressive forces from supporting anvil 19 and scoring wheel 21. R is the reaction force at clamps 17 and 18 and $M_R$ is the reaction moment at the clamps. In FIG. 2C, R and $M_R$ are very small. FIGS. 2D, 2E, and 2F are stress diagrams for fiber 11, showing the stress in fiber 11 just prior to crack growth, during operation of the device of FIG. 2A. Specifically, FIG. 2D shows tensile stress, FIG. 2E shows bending moment, and FIG. 2F shows shear stress. In each of FIGS. 2D, 2E, and 2F, the X axis is measured along fiber 11 between clamps 17 and 18, and the Y axis shows the unitless magnitudes of the illustrated forces and stresses. The location of the cleave line in FIGS. 2B–F is shown as item 22, and the location of the flaw is shown as item 23.

FIG. 2D shows the tensile stress, which is calculated to be approximately 9,800 psi, from the 85 grams of tensile load applied to the fiber, as stated in U.S. Pat. No. 5,123,581. FIG. 2E shows the approximate bending moment diagram, with the magnitude of the moment at the region of the flaw 23 calculated to be $0.07 \times 10^{-3}$ inch-lbs. FIG. 2F shows the shear stress diagram, with a stress of approximately 2000 psi calculated at the flaw 23. U.S. Pat. No. 5,123,581 does not give values for the shear stress or bending moment, but they can be calculated if the strength of the fiber and the cleave angle are known. The values are only approximate. The calculations are based on a cleave angle of 9 degrees. The calculations also show that the flaw size necessary to cause cleavage was relatively large, due to the relatively low tensile and shear stresses.

FIGS. 2C–2F illustrate that the magnitude of the bending moment acting on optical fiber 11 is very small. This is due to the very close proximity of the supporting anvil 19 and scoring wheel 21. Therefore, the bending stress has only a small affect on the propagation of the cleave. The stresses of importance in creating the angled cleave within the device of FIG. 2A are the applied tensile stress and shear stress. The shear stress is created by the compressive forces, $F_A$, produced by the action of supporting anvil 19 and scoring wheel 21.

Referring now to FIG. 3A, shown is an isometric view of the prior art Fujikura cleaver, disclosed in U.S. Pat. No. 5,024,363. The cleaver includes a first pair of optical fiber clamping pads 24 and a second pair of optical fiber clamping pads 26 which, through operation of hinge 27, clamp an optical fiber to be cleaved so that the fiber extends between clamping pads 24 and 26. The cleaver also includes cleaving hammer 28 and scoring wheel 29.

FIG. 3B is a magnified planar view of the apparatus in FIG. 3A, showing clamping pads 24 and 26, cleaving hammer 28 and scoring wheel 29. In operation, optical fiber 11 is clamped between pads 24 and 26. Scoring wheel 29 is then moved to contact fiber 11 to create a flaw 31 on the surface of optical fiber 11. Scoring wheel 29 is then moved away and cleaving hammer 28 is applied to the opposite surface of fiber 11 which results in a cleaving of fiber 11 along cleave line 32 substantially perpendicular to the longitudinal axis of optical fiber 11.

FIG. 3C is a free-body diagram of the forces exerted on optical fiber 11 during the operation of the apparatus of FIG. 3A. FIGS. 3D, 3E, and 3F are diagrams of the stresses acting along the length of fiber 11 during the cleaving operation of the apparatus in FIG. 3A. Due to the curved shape of the fiber 11, when the forces are acting on it, the shape of stress diagrams (FIGS. 3E and 3F) are approximate and not exact. The exact shape of the moment and shear diagrams are in reality somewhat curved. Referring to FIG. 3C, $F_A$ is the bending force applied by the cleaving hammer 28, $T_R$ is a reaction force created by pads 24 and 26 which produces tension along the length of fiber 11, R is a reaction force created by pads 24 and 26 which contribute to shear stress in the fiber, and $M_R$ is a reaction bending moment created by pads 24 and 26 that produces bending stresses in the fiber.

The values shown for the stresses and moment at the location of the flaw 31 were derived by finite element analysis. Certain assumptions were required, so the values are only approximate. The values used for the sharpness and size of the flaw 31, the tensile strength of the fiber 11, and the compliance of the rubber surface on the hammer 28 and on the clamping pads 24, 26 were approximated, and may add some error to the calculations. Actual measurements of the force and deflection required to cleave the fiber 11 have been made, and correspond reasonably well with the calculated values. The values are useful in distinguishing the difference between cleavers of prior art and the cleaver of the present invention. The values shown in the diagrams exist at the moment that crack propagation begins, and change considerably as the crack propagates.

At the location of the fiber flaw 31, there is a uniform bending moment and zero shear stress. This stress condition is caused by the shape and location of cleaving hammer 28, which is centered over the flaw in fiber 11 and shaped to apply bending forces $F_A$ on each side of flaw 31. This eliminates shear stress from the central region of fiber 11, as shown in FIG. 3F, and provides a uniform bending moment in the vicinity of flaw 31, as shown by FIG. 3E. The absence of shear stress is important in achieving a square cleave. In addition, as shown in FIG. 3D, a uniform tensile stress, created by the reaction force of pads 24 and 26, exists in fiber 11, even though there is no direct tensile load placed on fiber 11 as in the device of U.S. Pat. No. 5,123,581 discussed above. In traditional beam stress diagrams, pure tension within the beam is negligible because the beam's ratio of length to cross-sectional area, and total strain in the beam, are both relatively low. However, in the apparatus of FIG. 3A, the length of the fiber is very long (approximately 88 times longer than the diameter of fiber 11) and the fiber 11 is loaded to a point of high strain and deflection. In this case, the load applied by the cleaving hammer 28 causes substantial tension in the fiber, in addition to the bending and shear stresses. The pure tensile stress is a factor in the cleaving operation, and the tensile force is provided by the reaction force $T_R$ provided by clamps 24 and 26.

The bending moment, shown by FIG. 3E, produces tensile stresses on one side of fiber 11, and compressive stresses on the other side. At the point of the flaw 31, the bending moment produces a tensile stress that adds to the pure tension described above. Therefore, tensile stresses at the flaw 31 are produced by both the bending moment and pure tensile force. Thus, the bending stress is also a significant factor in the operation of the cleaver of FIG. 3A. In summary, the cleaver of FIG. 3A produces a substantially uniform tensile and bending stress, and zero shear stress, at the point of flaw 31, resulting in a square cleave.

Therefore, while square cleaving generally results in optical fiber splices with low insertion loss, high back reflection may result. On the other hand, while angled cleaving results in optical fiber splices with low back reflection, high insertion loss may result. It would thus be desirable to have an optical fiber cleaving method that would result in optical fiber splices that enjoy both low insertion loss and low back reflection.

SUMMARY OF THE INVENTION

The present invention largely obviates the above-noted discrepancies in the prior art by providing a novel method and apparatus for creating a combination of shear and tensile stresses for producing angled cleaves in optical fibers, resulting in a curved-angle cleave. Instead of using torsional or compressive forces to create shear stress, the present invention uses a bending force to create both tensile and shear stress. With the method and apparatus of the present invention, the ratio of shear stress to tensile stress changes as the cleave propagates across the optical fiber, producing a curved but angled fiber end-face.

Also contemplated by the present invention is a conversion kit that allows the optical fiber cleaver shown in FIG. 3A to be retrofitted so that it produces curved-angle cleaves, rather than square cleaves.

In accordance with the present invention, the desired stresses in the fiber being cleaved are created by proper design of the shape and location of the members that exert forces on the fiber being cleaved. These members include the cleaving hammer, flaw producing device, and clamping pads.

The cleaving hammer is shaped to provide a substantially concentrated load, instead of a widely distributed load. This essentially ensures that shear stresses exist substantially throughout the fiber. In addition, the hammer is placed in a predetermined location along the length of the fiber, to create higher shear stresses at the location of the flaw and to control the angle of the cleave.

Further, the clamping pads are spaced a distance apart that lowers tensile and bending stresses but increases shear stress, helping establish the proper ratio of shear and tensile stresses.

Further, the location of the flaw is placed at a predetermined location relative to the cleaving hammer and relative to the clamping pads, to ensure that it is in the proper region of shear, tensile, and bending stresses to control cleave angle.

As a result of the present invention, shear stress is increased and tensile stress is decreased at the location of the fiber flaw, and the combined shear and tensile stresses at the flaw cause a crack to begin propagating. As the crack propagates, the stresses in the fiber change because the cross-sectional area of the fiber decreases at the location of the crack. Because the stresses are created by bending the fiber, the ratio of the shear and tensile stress is changed as the crack propagates, which causes the crack to propagate at a greater and greater angle until the fiber breaks, providing a curved end-face to the cleaved fiber.

In particular, the present invention contemplates a method of cleaving an optical fiber including, providing an optical fiber, introducing a flaw in the optical fiber, and applying predetermined stress and strain to the optical fiber in the vicinity of the flaw to cause curve-angle cleaving of the optical fiber at the flaw. The flaw may be introduced in the optical fiber by substantially fixing first and second portions of the optical fiber, for example, by clamping, and then producing a flaw in the optical fiber between the first and second portions. Then, to cleave the fiber, a substantially concentrated force is applied to the fiber displaced from the flaw, on a side of the fiber opposite the side with the flaw, which causes the optical fiber to cleave with a curved-angle cleave. The concentrated force may be applied to the fiber either before or after introduction of the flaw.

The present invention also contemplates an apparatus for cleaving optical fibers, including first and second pairs of optical fiber clamps separated by first predetermined distance, a flaw-producing device adapted to introduce a flaw in a fiber clamped between the clamps, and a force applying device adapted to apply a substantially concentrated cleaving force to the fiber at a second predetermined distance from the first pair of clamps, the flaw-producing device being located between the force-applying device and the second pair of optical fiber clamps at a third predetermined distance from the force-applying device. The first predetermined distance is greater than the second predetermined distance which in turn is greater than the third predetermined distance. Each of the first, second and third predetermined distances having to select to produce a curved-angle cleave in the optical fiber. The first predetermined distance may be within the range of 6 millimeters to 12 millimeters, the second predetermined distance may be within the range of 3 millimeters to 10 millimeters, and the third predetermined distance may be within the range of 0.5 millimeters to 2 millimeters.

In one embodiment, the force-applying device is a formed hammer which may be a dual hammer piece having a first hammer structure formed to apply substantially concentrated force to the optical fiber when curved-angle cleaving is desired, and a second hammer structure formed to apply a distributed force of the optical fiber centered about the flaw to effect square cleaving of the optical fiber. The dual hammer piece may be rotatable between first and second positions to place either the first hammer structure or the second hammer structure in a position to apply force to the optical fiber.

In yet another embodiment of the invention, the first and second pairs of optical fiber clamps are moveable to adjust the first predetermined distance to effect either a curve-angle or square cleaving of the optical fiber. In yet another embodiment of the invention, the flaw-producing device is moveable to permit adjustment of the third predetermined distance in order to effect either curve-angle or square cleaving of the optical fiber.

The flaw in the fiber may be produced with a scoring wheel or a blade, a ceramic, carbide or diamond indenting wedge, or a mechanically or ultrasonically driven wedge.

The invention also contemplates a conversion kit that is used to convert a square optical fiber cleaver into a curved-angle optical fiber cleaver, the square optical fiber cleaver including, first and second pairs of optical fiber clamps separated by first predetermined distance, a flaw-producing device used to introduce a flaw in an optical fiber held in the clamps, and a distributed force cleaving hammer for applying a distributed cleaving force to the optical fiber, the conversion kit including, in combination, an extended pair of optical fiber clamps which are adapted to replace the first pair of optical fiber clamps to reduce the first predetermined distance, and a concentrated force cleaving hammer, adapted to replace the distributed force cleaving hammer, used to apply a substantially concentrated cleaving force to the optical fiber to effect curved-angle cleaving of the optical fiber.

In one embodiment of the conversion kit of the present invention, the extended pair of optical fiber clamps may comprise clamps spacing shims in combination with the existing first pair of optical fiber clamps, which are used together to reduce the first predetermined distance. In yet another embodiment, the conversion kit of the present invention may include flaw-producing device space shims which are adapted to shift the flaw-producing device in a longitudinal direction relative to the optical fiber, in order to shift the location of the flaw.

Also contemplated by the present invention is a curved-angle cleaved optical fiber end-face that has a cleave initiation angle within the range of 0° to 2°, a cleave angle at the core of the optical fiber within the range 3° to 10°, and a cleave roll-off dimension no greater than 60% of a diameter of the optical fiber.

These and other features and advantages of the present invention will become apparent to those of ordinary skill in this technology, with reference to the following detailed description and appended drawings.

DETAILED DESCRIPTION

Figure 4:
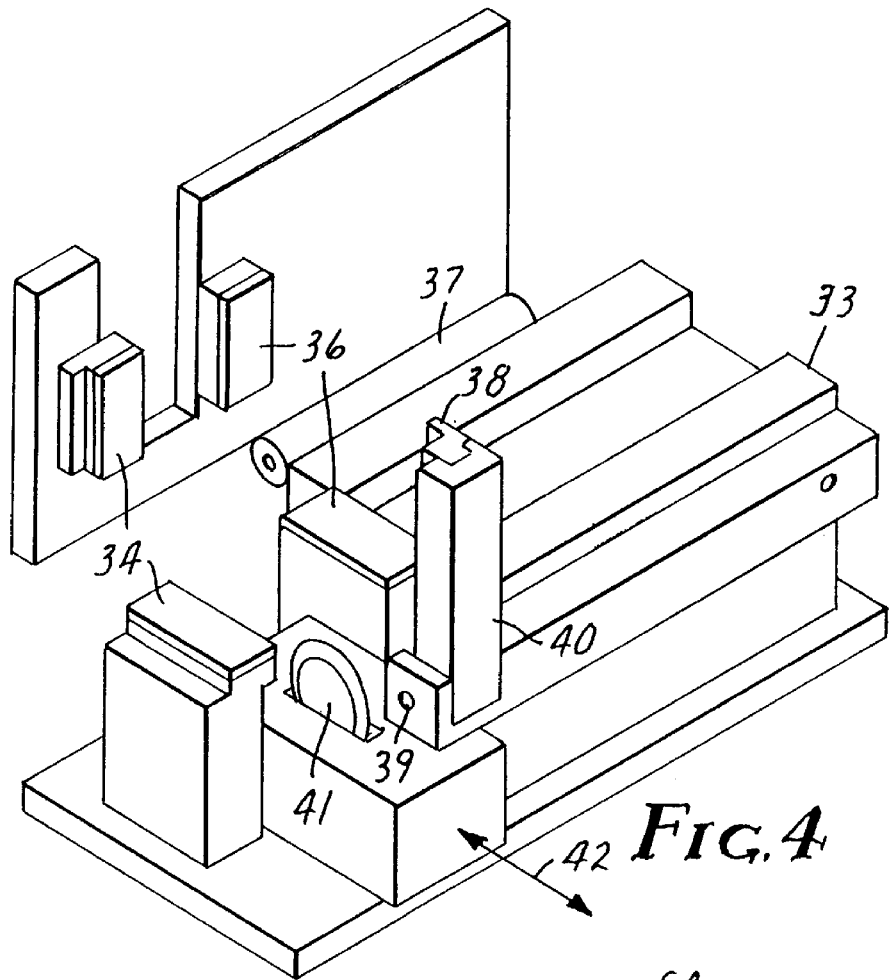
FIG. 4 is an optical fiber cleaver in accordance with the present invention.

Referring to FIG. 4, presented is a curved-angle optical fiber cleaver 33 in accordance with the present invention. Cleaver 33 includes a first pair of optical fiber clamping pads 34, and a second pair of optical fiber clamping pads 36. Clamping pads 34 and 36 operate to clamp an optical fiber (shown in more detail in FIGS. 5A–C) through action of hinge 37. Cleaver 33 also includes cleaving hammer 38 mounted on pivot arm 40 which is pivotable about pin 39, and flaw producing device 41, which is movable in the direction of double ended arrow 42 in and out of a fiber scoring position. Flaw producing device 41 may be, for example, a scoring device such as a wheel or blade, an optical fiber indenting device such as a ceramic, carbide or diamond indenting wedge, or a chiseling device such as a mechanically or ultrasonically driven wedge, or other devices capable of producing controllable flaws in optical fibers. For convenience and clarity, flaw producing device 41 is shown, for example, as a scoring wheel, but this should not be considered to limit the invention.

Figure 5A:
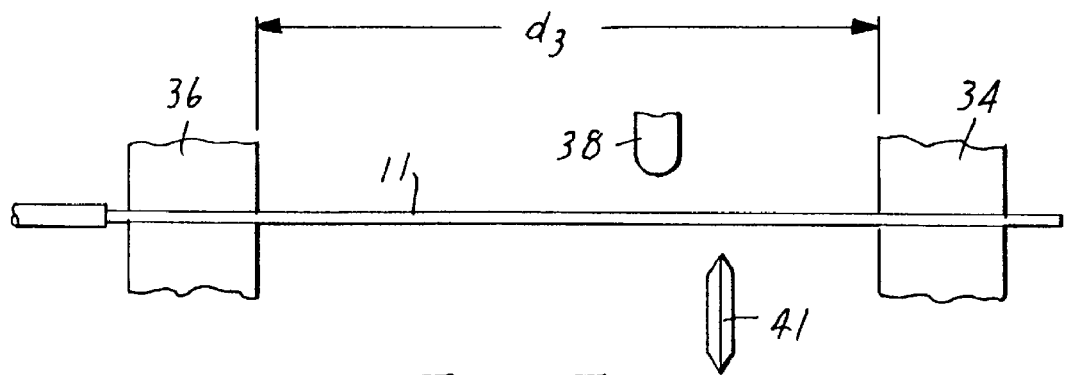
FIGS. 5A–C illustrate the method of operating the apparatus of FIG. 4 to produce curved-angle cleaves in accordance with the present invention.
Figure 5B:
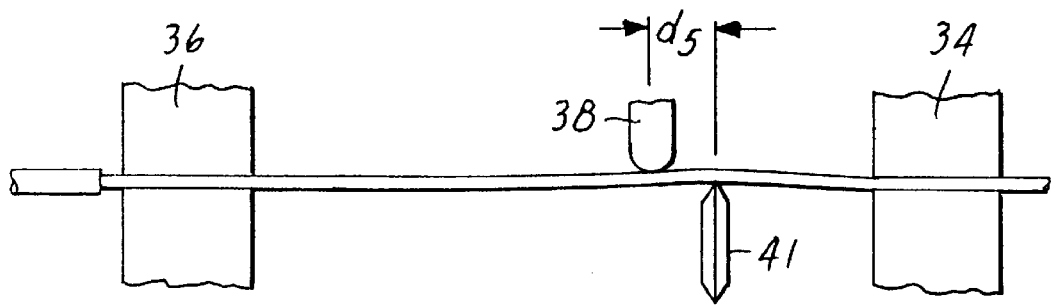
Figure 5C:
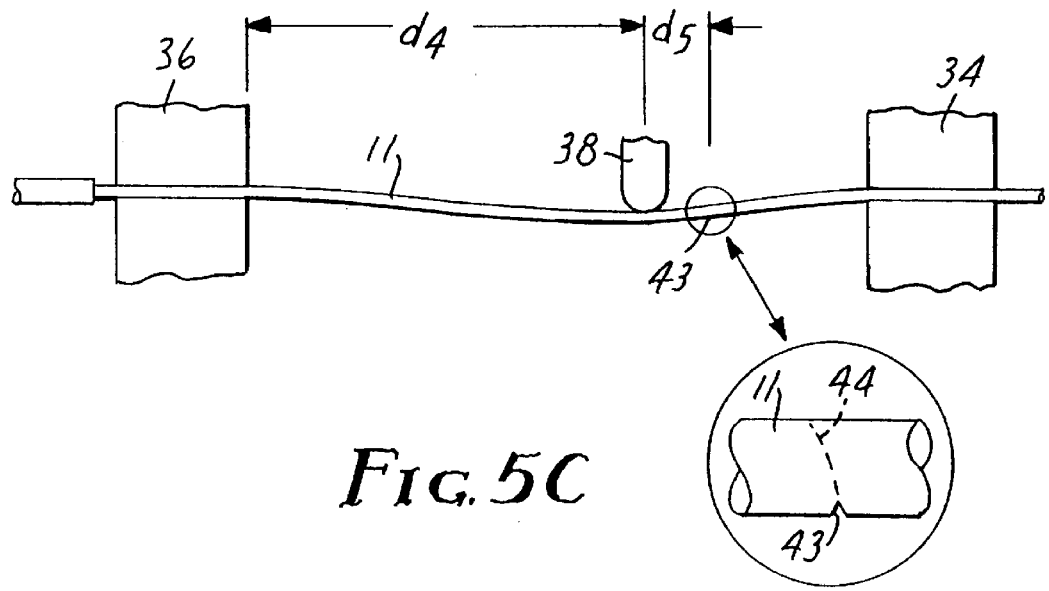

FIGS. 5A–C illustrate the operation of cleaver 33, in accordance with the present invention. First, the optical fiber 11 is clamped between first and second pairs of clamps 34, 36 as shown in FIG. 5A. Clamp pairs 34 and 36 are located a distance $d_3$ apart.

Then, as shown in FIG. 5B, flaw producing device 41, which is located a distance $d_5$ from cleaving hammer 38, is brought into contact with fiber 11 to produce a flaw 43 on a first side of optical fiber 11. Then, as shown in FIG. 5C, flaw producing device 41 is moved away from fiber 11 and cleaving hammer 38, located a distance $d_4$ from clamping pads 36 is pressed against the opposite side of fiber 11, creating tensile, bending and shear stresses in fiber 11. As cleaving hammer 38 is lowered, the stresses rise until fiber 11 breaks, resulting in curved-angle cleave 44.

Figure 6A:
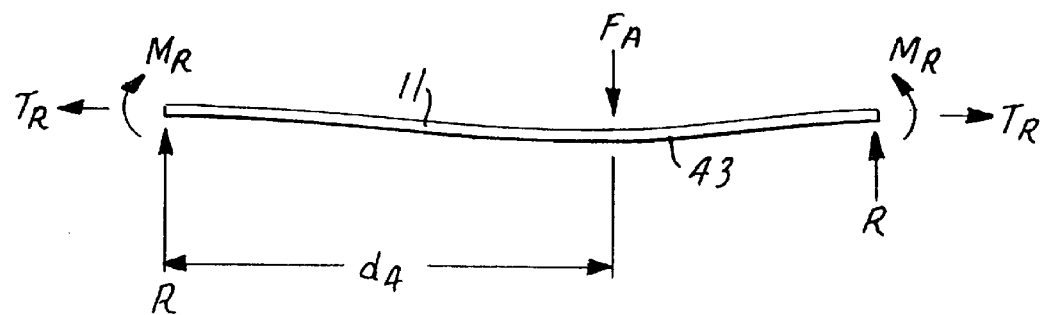
FIGS. 6A–D are a free-body diagram and stress curves, illustrating the operation of the apparatus of FIG. 4.
Figure 6B:
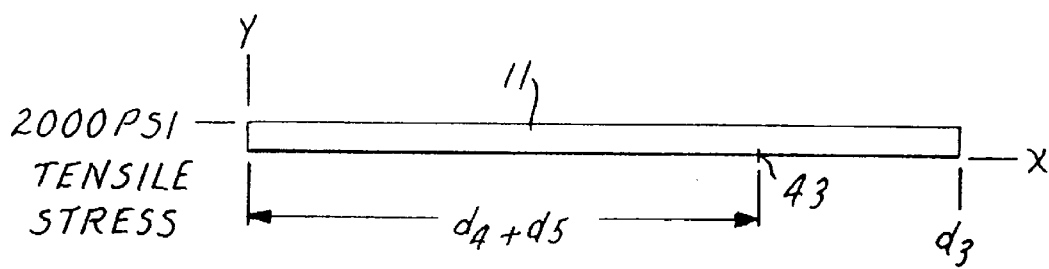
Figure 6C:
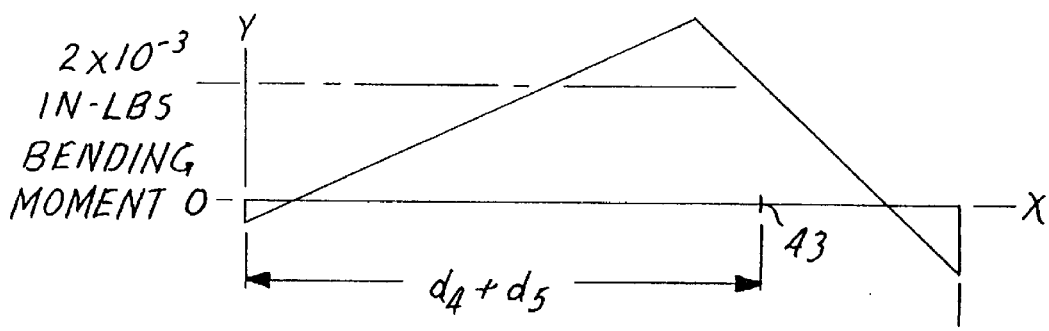
Figure 6D:
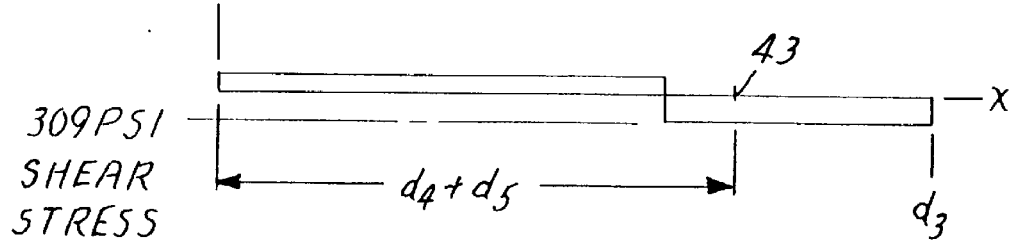

FIGS. 6B, 6C, and 6D show the tensile stress, bending moment, and shear stress that exist at the flaw 43 just prior to crack propagation. The values shown were calculated using finite-element analysis, and are approximate, due to the assumed values used for the size and shape of the flaw 43, the strength of the fiber 11, and the compliance of the rubber surfaces of clamping pads 34, 36. The values shown in FIGS. 6B, 6C and 6D were calculated using the following distances: $d_3$=9.5 millimeters, $d_4$=6.25 millimeters, and $d_5$=0.75 millimeters. Actual measurements of the force and deflection required to cleave the fiber 11 have been made, and correspond reasonably well with calculated values. It can be seen that there is a slight shear stress present at the flaw 43. The calculated shear and tensile stresses predict a cleave initiation angle of 0.6 degrees, which agrees with the measured angle at the beginning of the curved-angle cleave. As the crack grows, the stresses change so that there is a larger shear stress, resulting in an increasing cleave angle.

Referring now to FIG. 6A–6D, shown is a free-body diagram of the forces acting on fiber 11, along with diagrams of the stresses along the length of fiber 11, during the operation of cleaver 33 of FIG. 4 in accordance with the operation of the present invention. Due to the curved shape of fiber 11, when the forces are acting on it, the shape of the stress diagrams (FIGS. 6C and 6D) are approximate and not exact. The moment and shear diagrams are in fact somewhat curved. Force, $F_A$ is the force applied to fiber 11 by cleaving hammer 38. As stated above, this force is a substantially concentrated force applied over a short length of fiber 11. $T_R$ is the reaction force creating tension in fiber 11 due to the application of force $F_A$ and exerted on fiber 11 by clamping pads 34 and 36. R is the reaction force applied to fiber 11 by clamping pads 34 and 36, as a result of application of force $F_A$. Reaction force R contributes to shear within fiber 11 including at the point of flaw 43. Finally, $M_R$ is a reaction moment created by clamping pads 34 and 36 as a result of application of force $F_A$. The result is a combination of tensile, bending and shear stresses acting on optical fiber 11 in the vicinity of flaw 43.

Figure 7A:
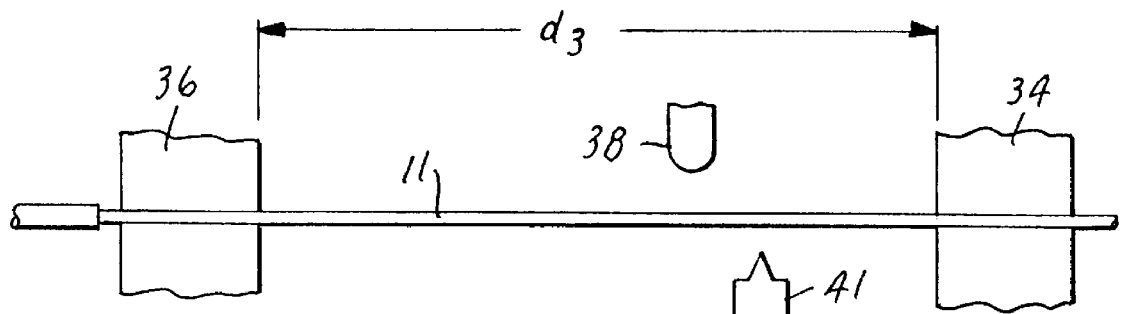
FIGS. 7A–C illustrate another method of operating the apparatus of FIG. 4 to produce curved-angle cleaves in accordance with the present invention.
Figure 7B:
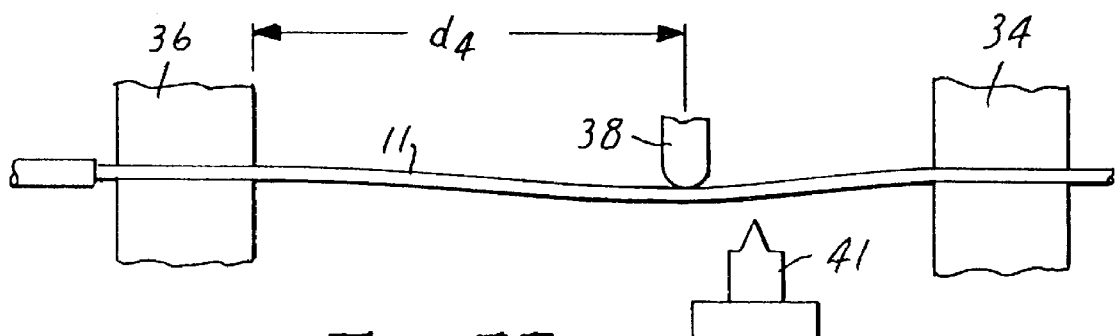
Figure 7C:
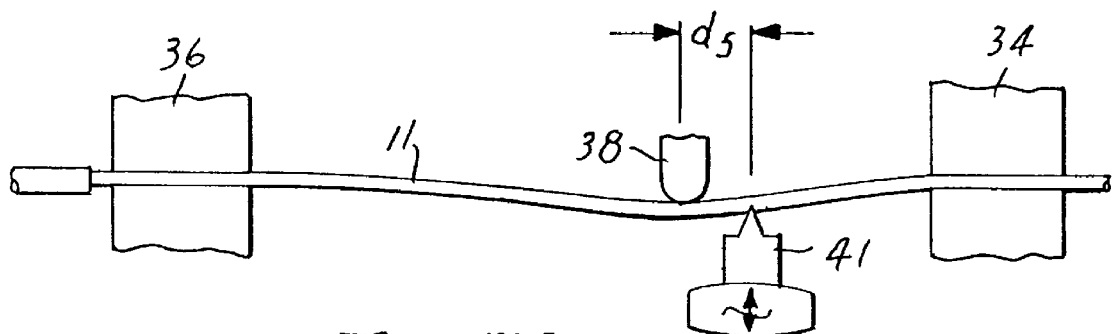

Another way to operate cleaver 33 of the present invention is to apply the flaw producing device 41 to the fiber 11 after the bending force $F_A$ from hammer 38 is applied. In this case, the cleaving operations would correspond to the operations shown in FIGS. 7A–7C. The free-body, bending, and shear diagrams of FIGS. 6A–6D are still applicable, as long as flaw producing device 41 (illustrated as an ultrasonic chisel in FIGS. 7A–7B) is capable of producing a flaw in fiber 11 without exerting a significant bending force or deflection to the fiber 11, as long as the applied bending force $F_A$ is approximately the same. Therefore, in accordance with the present invention, it is not necessary to create the flaw 43 prior to introduction of hammer force $F_A$, if the flaw-producing device 41 is such that it produces negligible bending forces on the fiber 11. As mentioned above, flaw producing device 41 may be a scoring wheel, indentor, or ultrasonic chisel, but whatever device is used, it should be applied in a way that does not apply a significant bending force to the fiber 11. The ultrasonic chisel appears to be the preferred flaw-producing device 41 if the flaw 43 is produced after the hammer force $F_A$ is applied to the fiber, however, a very sharp scoring wheel has also proven effective.

Therefore, in another embodiment of the present invention, a cleaving device is contemplated which first uses a pair of clamping pads 34, 36 spaced a distance $d_3$ of 9.5 millimeters to clamp the fiber 11. Next, a hammer 38 is forced against the fiber 11 at distance $d_4$ of 6.25 millimeters, to produce the bending, tensile, and shear stresses, shown in diagrams 6A–6D. Finally, a flaw-producing device 41 is brought into contact with fiber 11 at a distance $d_5$ of 0.75 millimeters from hammer 38, without exerting significant bending force or deflection of fiber 11, creating a flaw 43 and initiating a curved-angle cleave.

In accordance with the present invention, the spacing $d_3$ between clamping pads 34 and 36 is preferably many times larger than the diameter of fiber 11 in order to ensure that the bending force, $F_A$, applied by cleaving hammer 38 will create tension in the fiber 11. Distance $d_3$ is preferably within the range of 6 to 12 millimeters. Also in accordance with the present invention, the difference between the positions of cleaving hammer 38 and scoring wheel 41 ($d_5$) is much greater than the diameter of fiber 11, and is preferably within the range of 0.5 to 2.0 millimeters. In addition, cleaving hammer 38 is preferably located nearer to clamping pads 34 than to clamping pads 36, so that distance $d_4$ is preferably within the range of 3 millimeters to 10 millimeters. Flaw producing device 41 is positioned to create flaw 43 in fiber 11 between cleaving hammer 38 and clamping pads 34.

The exact dimensions for distances $d_3$, $d_4$, and $d_5$, as well as the precise shape of cleaving hammer 38 will depend upon the target specifications of the curve-angled cleave to be produced by cleaver 33. This means that certain factors should be considered when determining the desired distances.

A first factor is achieving the desired angle at the fiber core. Generally, an angle in the range of 3° to 10° is desired, depending on the reflection and other requirements. The angle at the core can be increased by placing the clamping pads 34, 36 closer together. This is true for a clamped fiber having a concentrated hammer force applied a certain longitudinal distance away from a flaw in the fiber. As mentioned previously, in accordance with the present invention, a substantially concentrated load is applied to the fiber 11 at a distance away from a created flaw 43, to place the flaw 43 in a region of shear stress in the fiber 11. The bending moment and pure tensile stress in a loaded beam with fixed supports will decrease if the supports are placed closer together. Thus, for a given hammer force $F_A$, the bending moment and the pure tensile stress in the fiber $F_A$ will decrease when the pads 34, 36 are spaced closer together. However, for a given hammer force $F_A$, the shear stress remains unchanged regardless of pad spacing. To provide sufficient stress to cleave the fiber $F_A$, the hammer force must be increased to compensate for the reduced tensile stresses at the flaw 43, which resulted from the closer pad spacing. As the hammer force $F_A$ is increased to compensate, all stresses at the flaw 43, including the shear stress, increase. Therefore, the distance $d_3$ between clamping pads 34, 36 should not be too great. Placing the pads 34, 36 closer together increases the shear stress at the flaw 43, producing greater cleave angles. The distance between clamping pads 34, 36 for square cleavers, such as the Fujikura cleaver, is typically higher than the distance in the present invention.

Another way to increase the angle in the fiber is to place the location of the hammer 38 and flaw 43 near clamping pads 34. For a loaded beam with fixed supports, shifting the load away from the center results in increased shear stresses in the region between the applied load and the nearest support. Since the flaw 43 is between hammer 38 and pads 34, shifting both the flaw and the hammer closer to clamping pads 34 increases the shear stress at the location of the flaw 43. Therefore, the location of the hammer force $F_A$ should not be too far from clamping pads 34.

Another way to increase the angle is to increase the distance between the flaw 43 and the hammer 38. The maximum bending moment, and therefore the maximum tensile stress at the side of the fiber 11, is directly opposite the hammer 38 at the opposite side of the fiber 11. At points further from the hammer 38, the tensile stress from the bending moment decreases, while the shear stress remains constant. Therefore, placing the flaw 43 at a greater location from the hammer 38, places it in a region of reduced tensile stress, for a given hammer force $F_A$. To cleave the fiber 11, a larger hammer force $F_A$ must be applied, which increases all stresses at the flaw 43, including the shear stress which produces the angled cleave. Therefore, the distance $d_5$ between the hammer 38 and flaw 43 should not be too small.

Another factor in determining the proper values for distances $d_3$, $d_4$, and $d_5$ is the shape of the curvature on the curved-angle cleave on fiber 11. The preferred values for $d_3$, $d_4$, and $d_5$ will produce a cleaved end-face with a radius that changes gradually across the face of the fiber 11, while at the same time providing the desired angle at the core 14. Other design conditions will produce the desired angle at the core 14, but will also produce a curvature that increases radically across the face of the fiber 11. If the curvature increases radically, a "roll-off" results. A roll-off is not desirable, because it can result in poor fiber alignment in a mechanical splice. Therefore, the values for distances $d_3$, $d_4$, and $d_5$ are selected to give the desired angle at the core 14, but at the same time providing a slight curvature that changes gradually, instead of a large curvature that results in a roll-off. The curvature is created because the ratio of shear stress to tensile stress changes as the crack grows. The values for $d_3$, $d_4$, and $d_5$ affect to what degree the ratio changes. If force $F_A$, applied by cleaving hammer 38 is located too close to flaw 43, or if flaw 43 is placed too close to clamping pads 34, or if clamping pads 34 and 36 are placed too close together, then the roll-off may be extreme. Therefore, these conditions are to be avoided.

Another way to reduce the rolloff involves the use of a spring-loaded clamping pad to produce a higher tension in the fiber, and the application of a bending force to create shear and bending stresses, and finally the introduction of a flaw to cause cleaving. This method of angled cleaving produces stresses in the fiber that are different than the stresses shown in FIGS. 6B and 6D, and a bending moment that is different than shown in FIG. 6C.

The inventors have developed a cleaver model that produces angled cleaves with a substantially planar, but slightly curved, angled end-face. In that model, the fiber is first clamped between one fixed clamping pad and one spring-loaded clamping pad, producing a tension of approximately 160 grams on the fiber, creating a tensile stress of approximately 18,000 psi. The clamping pad were spaced a distance $d_3$ of approximately 10.5 millimeters. Next, a hammer exerting a concentrated bending force $F_A$ was applied to the fiber at a distance $d_4$ of approximately 4.5 millimeters, deflecting the fiber approximately 0.75 millimeters. Finally, a flaw was produced with an ultrasonic chisel, at a distance $d_5$ of approximately 1.0 millimeters from the applied bending force, causing the fiber to cleave. This set of conditions produces an angled cleave that is more planar, with a slight curvature and rolloff, and with an angle at the core of approximately 5 degrees. Angled cleaves with lesser or greater angels at the core, and with lesser or greater amounts of curvature, may be produced if the magnitude and/or the location of the applied tensile force and/or the applied bending force are changed, and/or if the location of the clamping pads are changed.

Figure 1A:
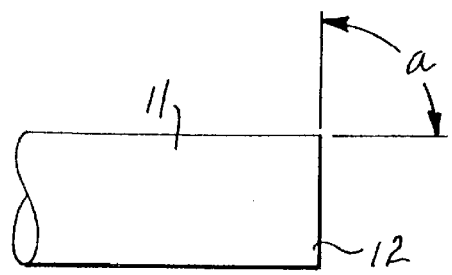
FIG. 1A is a prior art square cleaved optical fiber.
Figure 1C:
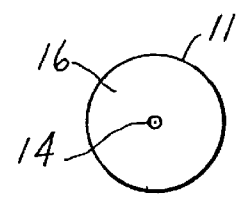
FIG. 1C is an end view of a cleaved optical fiber.
Figure 1B:
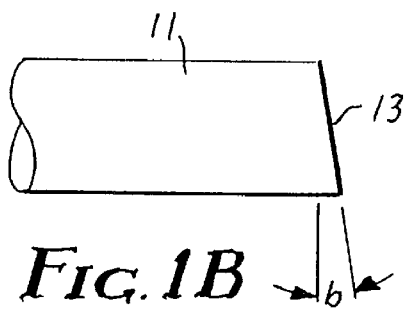
FIG. 1B is a prior art angle cleaved optical fiber.
Figure 2A:
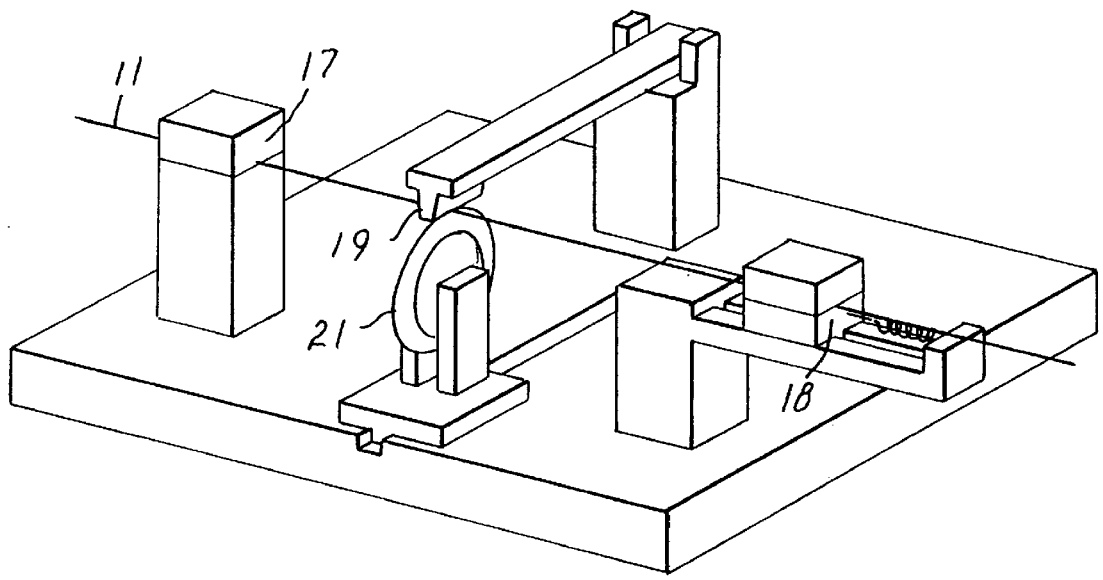
FIGS. 2A–F are isometric and plan views, free-body diagram and stress diagrams for a prior art angle cleaver.
Figure 2B:
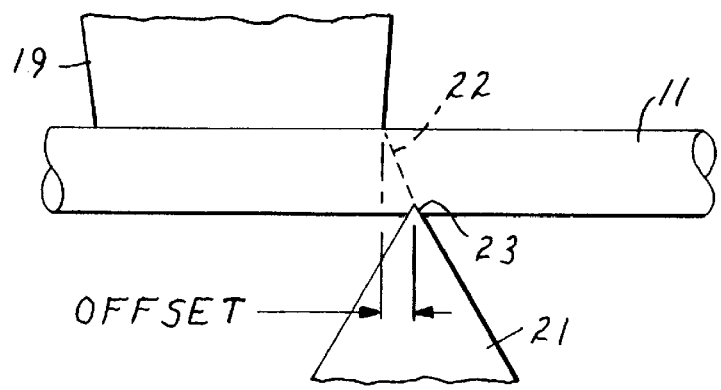
Figure 2C:
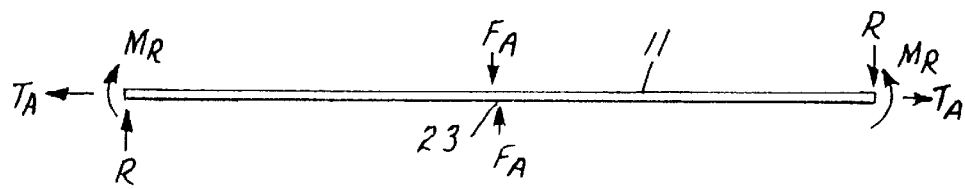
Figure 2D:
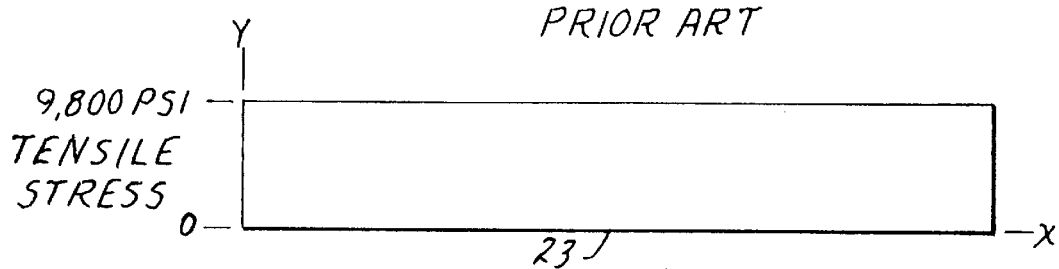
Figure 2E:
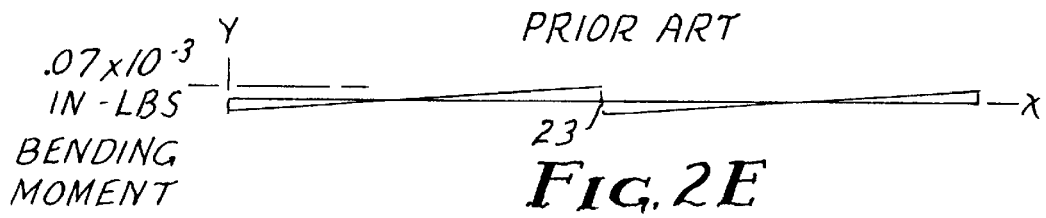
Figure 2F:
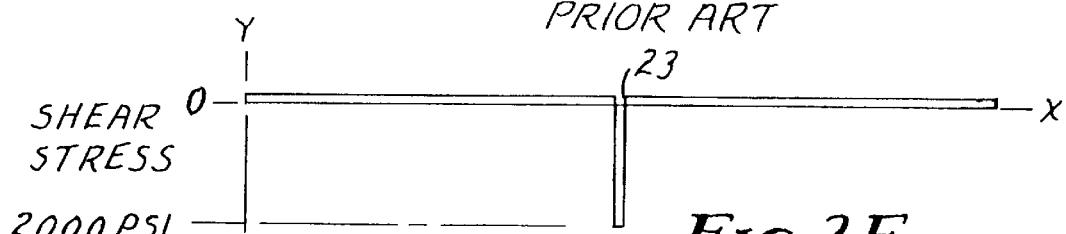
Figure 3A:
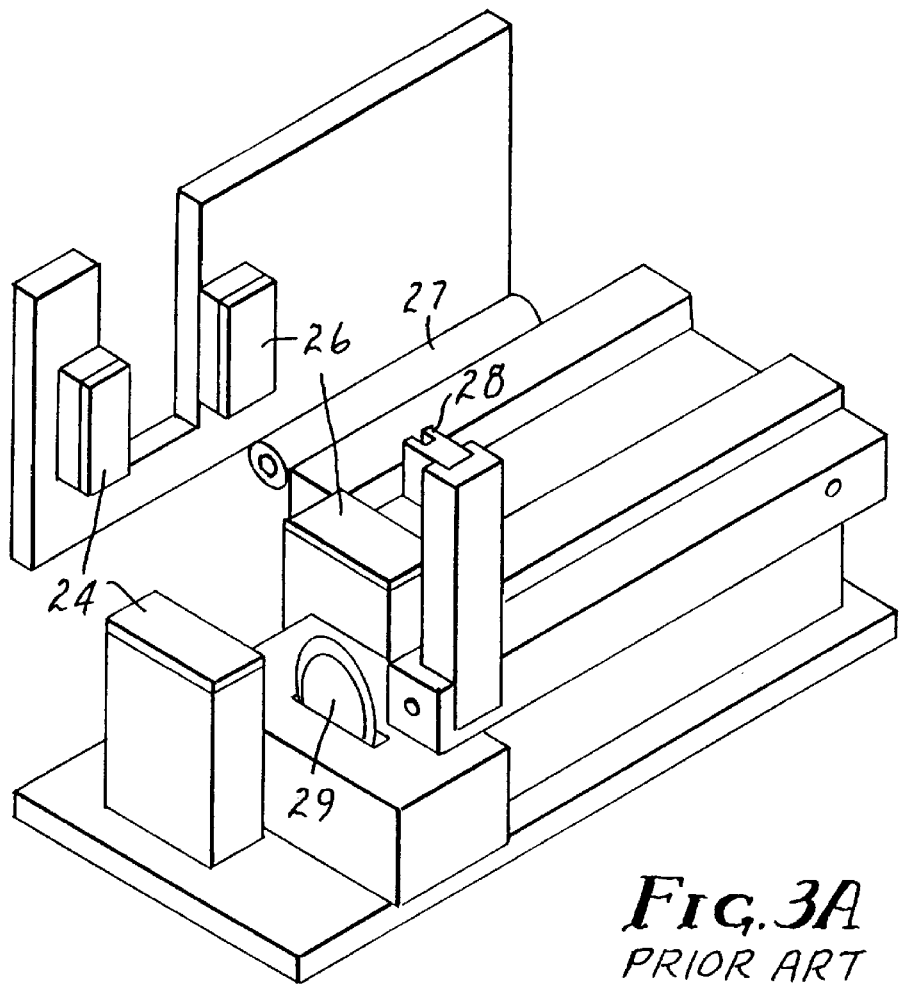
FIGS. 3A–F are isometric plan views, free-body diagram and stress diagrams for a prior art square cleaver.
Figure 3B:
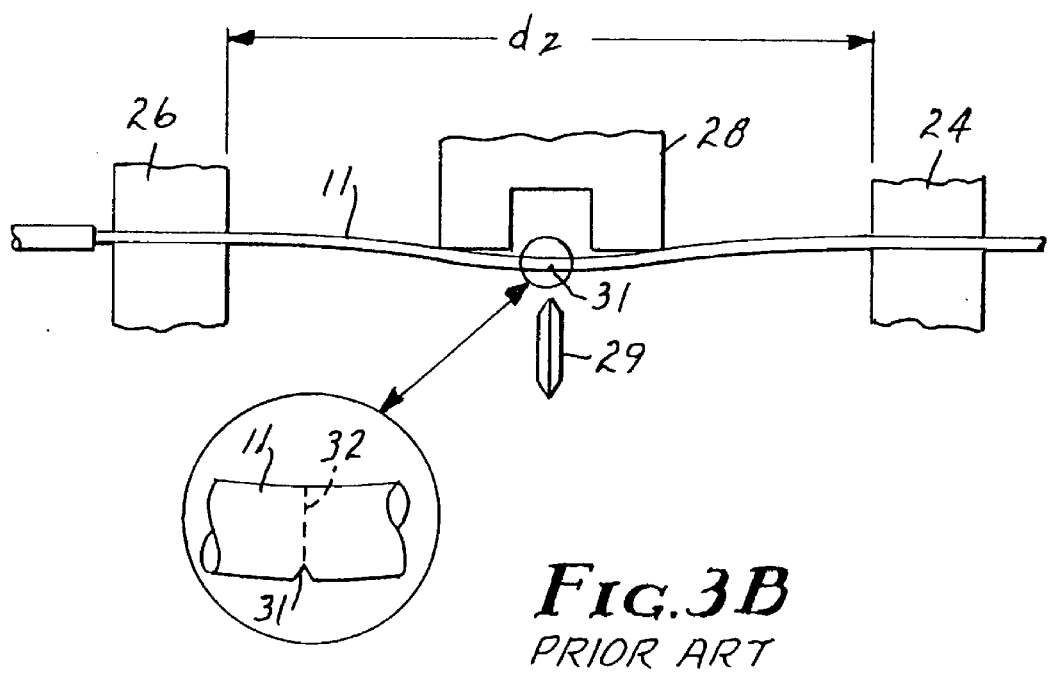
Figure 3C:
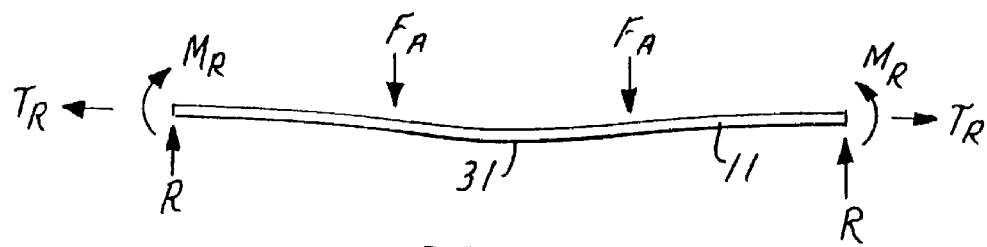
Figure 3D:
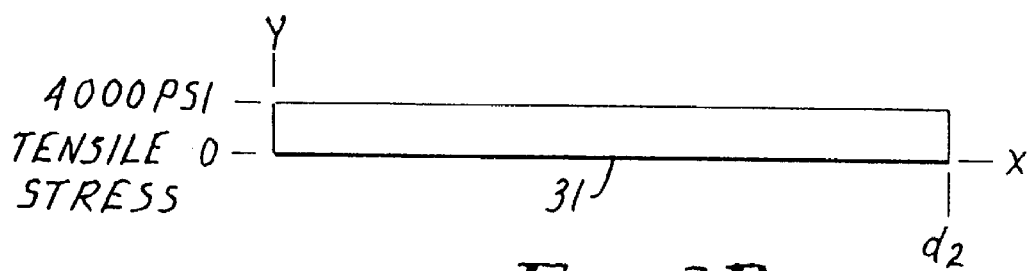
Figure 3E:
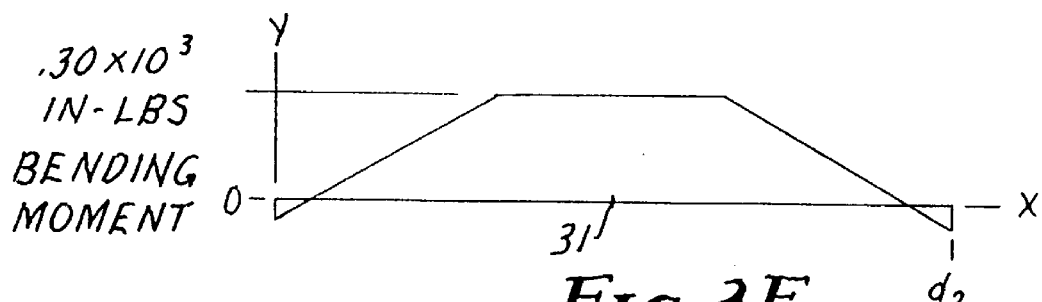
Figure 3F:
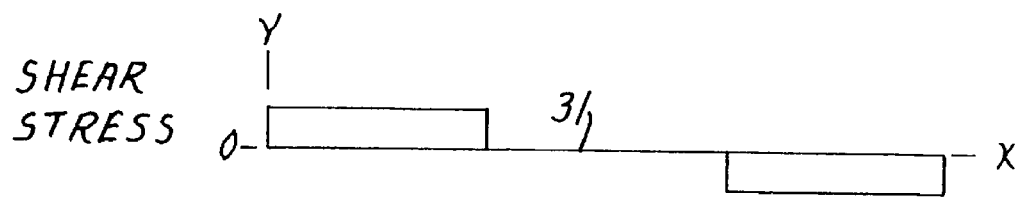
Figure 8B:
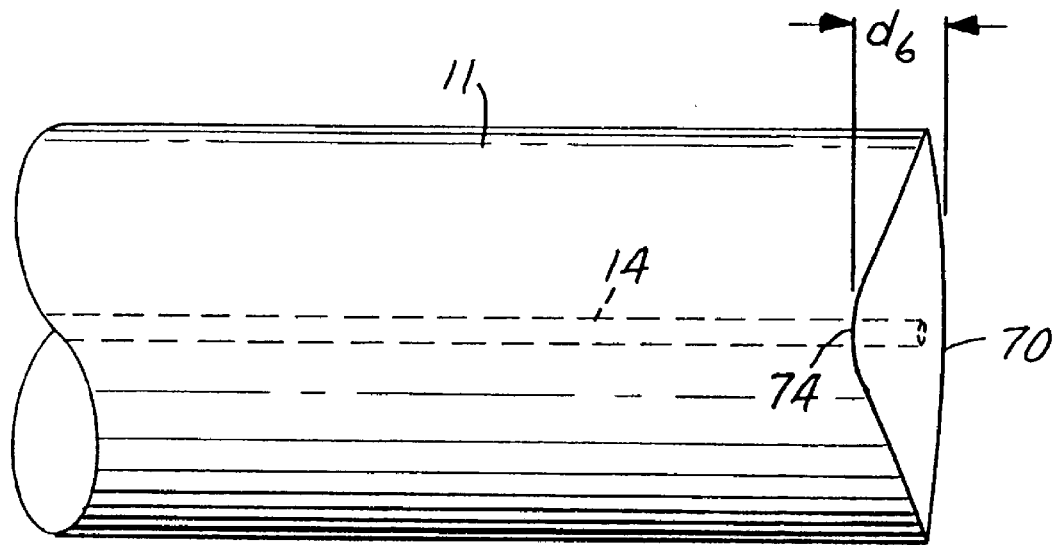
FIGS. 8A and 8B are two views of a curved-angle cleaved optical fiber according to the present invention.
Figure 8A:
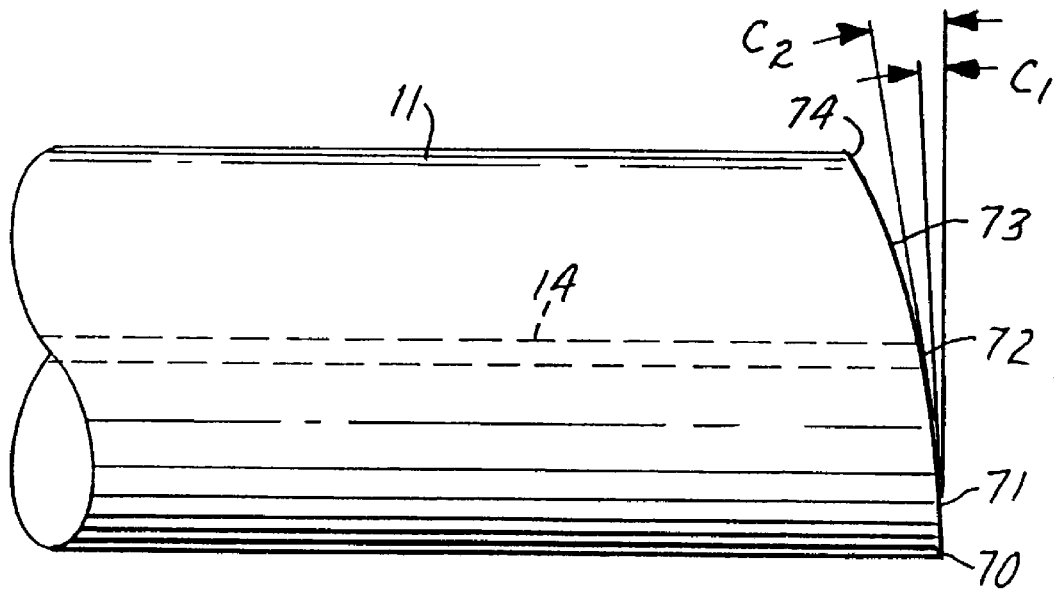

Referring now to FIG. 8A, which is a side view of the cleaved fiber 11, and FIG. 8B, which is a top view, the preferred size and shape of the curved face and roll-off are described. In this discussion, the term "roll-off" describes any amount of curvature at the end of the cleave. This is in contrast to the typical definition of a roll-off, which describes a very abrupt drop-off that exists at the end of an otherwise square and planer cleave, as demonstrated, for example, in FIG. 1C of U.S. Pat. No. 4,027,814.

The curvature described possesses the features shown in FIGS. 8A and 8B. In order to obtain the maximum benefit that the curved cleave provides when splicing unkeyed fibers, it is desirable that the curvature be very small at the beginning region of the crack. This can be understood by noting the reduced longitudinal separation between fiber faces as shown, for example, in FIG. 9D relative to FIG. 9B, discussed in more detail below. This region is shown as region 71 on the fiber 11 shown in FIG. 8A, with the flaw being shown as feature 70. At region 71, the angle, $c_1$, should be substantially square, or ideally in the range of 0° to 1°. Other acceptable embodiments give angles, $c_1$, in region 71 as high as 2°, but angle, $c_1$, is generally smaller. With a particular embodiment of the invention, stress calculations predict an angle, $c_1$, of 0.6° at the beginning of the cleaved region 71, and actual angles, $c_1$, have been measured to be in the range of 0.5° to 1.0°.

As the crack progresses, the angle becomes progressively larger, so that at the central region 72 near the core 14, the angle, $c_2$, is large enough to produce low back reflection in a splice. The angle, $c_2$, in region 72, measured as the tangent of the curve at the core 14, should ideally be at least 4°, with an angle of 6° being typical and with a range of 3° to 10° being acceptable. As the crack continues to grow, it enters the final region 73, where the angle continues to become progressively larger. The angle should not become excessively large, or a large roll-off may result. A large roll-off can contribute to high loss when using certain mechanical splices, as an example the 3M Fibrlok brand splice. Other mechanical splices may be more sensitive or less sensitive to the size of the roll-off. One method to measure the roll-off is to measure the longitudinal distance $d_6$ from the flaw 70 of the fiber 11 to the furthest point 74 at which the curved surface intersects the cylindrical surface of the fiber 11. Defining the size of the roll-off dimension as the distance $d_6$ from point 74 to the flaw 70, the preferred curved-angle will not have a roll-off dimension larger than approximately 75% of the diameter of fiber 11. The size of the roll-off dimensions measured on fibers cleaved according to the present invention is typically between 20% and 60% of the diameter of fiber 11, although roll-off dimensions within the range of 10% to 75% of the diameter of the diameter of fiber 11, would also be considered acceptable. FIG. 8B shows a top view of the cleaved fiber 11 with point 74 being the end of the roll-off and $d_6$ being the measured size of the roll-off dimension. Tests performed on the 3M mechanical splice show no substantial decrease in splice performance with a small roll-off dimension.

Another factor in establishing distance $d_3$, $d_4$ and $d_5$ is the prevention of the slippage of fiber 11 between clamping pads 34 and 36. Excessively large tension created in fiber 11 as a result of application of force $F_A$ by cleaving hammer 38 may cause fiber 11 to slip within pads 34 and/or 36, degrading cleaving results. To prevent this, the force, $F_A$, applied by cleaving hammer 38 should not be placed too far from the location of flaw 43. As force $F_A$ applied by cleaving hammer 38 is located further from flaw 43, the bending stress (which creates tension at the flaw) is reduced. To compensate for the reduced bending stress at flaw 43, a large hammer force $F_A$ must be applied, which increases the tension in the fiber 11. If the force $F_A$ applied by cleaving hammer 38 is too high, the tension increases to the point that the clamping pads 34 and 36 can no longer provide the needed gripping force, and fiber 11 will slip through the pads 34 and 36. Also, if the force $F_A$ applied by hammer 38 is too high, the stress in the fiber 11 at the location of the hammer 38 may exceed the fiber strength, causing the fiber 11 to break at the location of the hammer 38. Thus, force $F_A$ applied by cleaving hammer 38 should not be placed too far from flaw 43. In other words, dimension $d_5$ should not be too large.

It has been determined that distance $d_3$ may be within the range of 6–12 millimeters, distance $d_4$ may be within the range of 3–10 millimeters, and distance $d_5$ may be within the range of 0.5–2.0 millimeters. In all cases, $d_5 < d_4 < d_3$. In accordance with one embodiment of the invention, distance $d_3$ is 9.5 millimeters, distance $d_4$ is 6.25 millimeters, and distance $d_5$ is 0.75 millimeters. These dimensions resulted in 95% of the cleaves having angles, $c_2$, greater than 4.5 degrees. Greater cleave angles, $c_2$, may be achieved by reducing clamps spacing, $d_3$, and/or by moving flaw producing device 41 and cleaving hammer 38 closer to clamping pads 34 (in other words, by increasing distances $d_4$ and $d_5$).

The curved-angle cleaver of the present invention has a number of advantages over the prior art angle cleaver shown in FIGS. 2A–F. The first advantage is that the end-faces of a fiber cleaved in accordance with the present invention are not planar, but instead are curved. This results in a lower longitudinal separation, s, between fiber end-faces in a splice, as illustrated in FIGS. 9A–D.

Figure 9A:
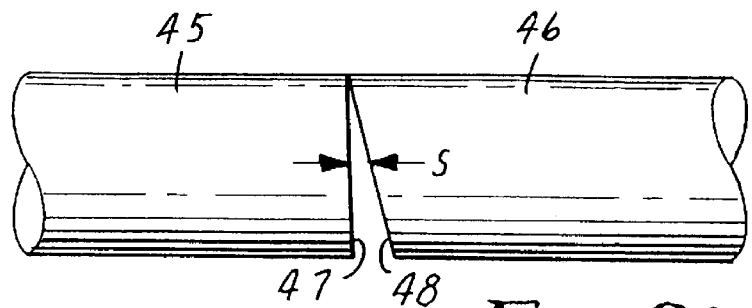
FIGS. 9A–D illustrate the advantages of the curved-angle cleave of the present invention over prior art angle cleaves.
Figure 9B:
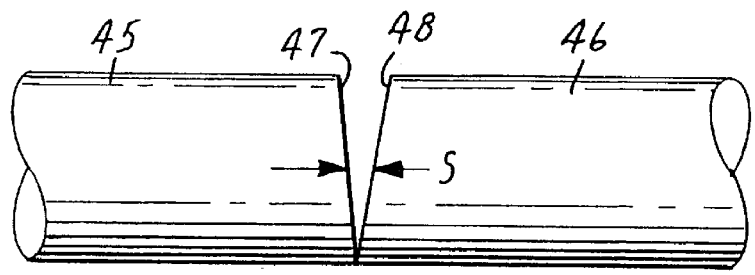

FIGS. 9A and 9B show two mating fibers 45 and 46 with angled end-faces, one at 5° (end-face 47) and one at 9° (end-face 48). This disparity between angles accurately represents the tolerance spread in some angle cleavers. The ends of fibers 45 and 46 are brought into contact as they would be in a mechanical splice. The fibers 45 and 46 in FIG. 9A are shown in a "keyed" arrangement, whereas the fibers in FIG. 9B are shown in an "unkeyed" arrangement. Keyed fibers are oriented for minimum longitudinal separation, s, whereas unkeyed fibers are in any other orientation.

Figure 9C:
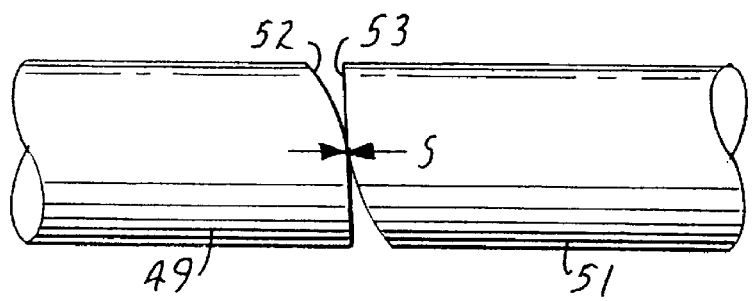
Figure 9D:
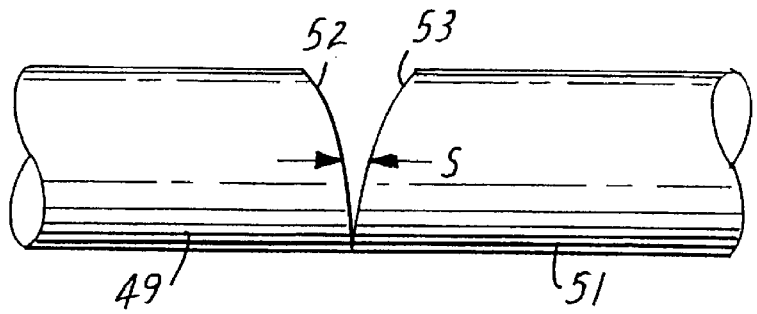

FIGS. 9C and 9D show curved-angled cleaved fibers 49 and 51 prepared according to the present invention, which have curved-angled end-faces; one at 5° (curved-angled end-face 52) and one at 9° (curved-angled end-face 53). The fibers 49 and 51 shown in FIG. 9C are shown in a keyed arrangement, whereas those shown in FIG. 9D are shown in an unkeyed arrangement. As can be seen from FIGS. 9A–9D, the separation, s, at the core of the optical fibers (also see FIG. 1C) is less with curved-angled end-faces (FIGS. 9C and D), than it is with planar angled end-faces (FIGS. 9A and 9B), which reduces insertion loss and provides a significant advantage for mechanical splicing.

Another advantage of the present invention is that the curved-angle method is better suited to cleaving optical fiber ribbon, including the twelve-fiber ribbons on the market today. Although U.S. Pat. No. 5,123,581 (discussed above with reference to FIG. 2A) mentions the ability to cleave ribbon, in reality this would be difficult, for two reasons.

First, tolerances must be very tight to ensure that the anvil 19 and scoring wheel 21 make proper contact with all twelve fibers; and second, the tensile load on the uncleaved fibers will increase as each previous fiber in the ribbon is cleaved. In other words, it would be difficult to apply equal forces to all twelve fibers in the ribbon. The present invention allows angled cleaving of optical fiber ribbon, with very consistent results.

Another advantage of the curved-angled method of the present invention, is that it can be applied, through retrofitting, to a widely-used cleaver already on the market. This existing cleaver (the Fujikura CT-0X series cleaver), is illustrated in FIGS. 3A–F, and is the subject of U.S. Pat. No. 5,024,363, the disclosure of which is expressly incorporated herein by reference.

The present invention contemplates a conversion kit that allows owners of the Fujikura cleaver to quickly, easily and inexpensively modify the cleaver to produce curved-angle cleaving instead of square cleaving resulting in the first known angled cleaver capable of cleaving optical fiber ribbon.

Figure 10:
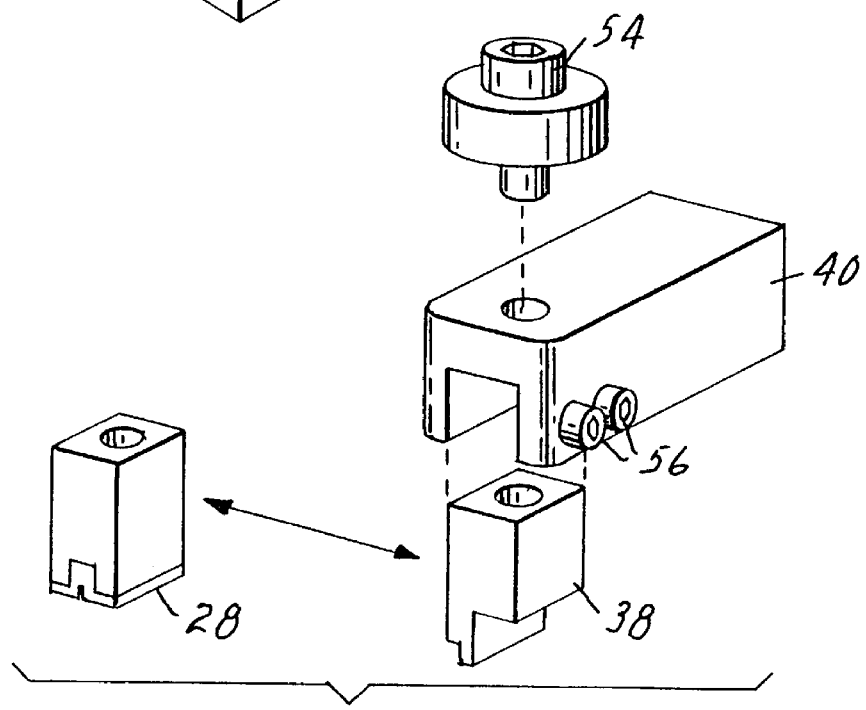
FIGS. 10 and 11 are an embodiment of a conversion kit in accordance with the present invention.
Figure 11:
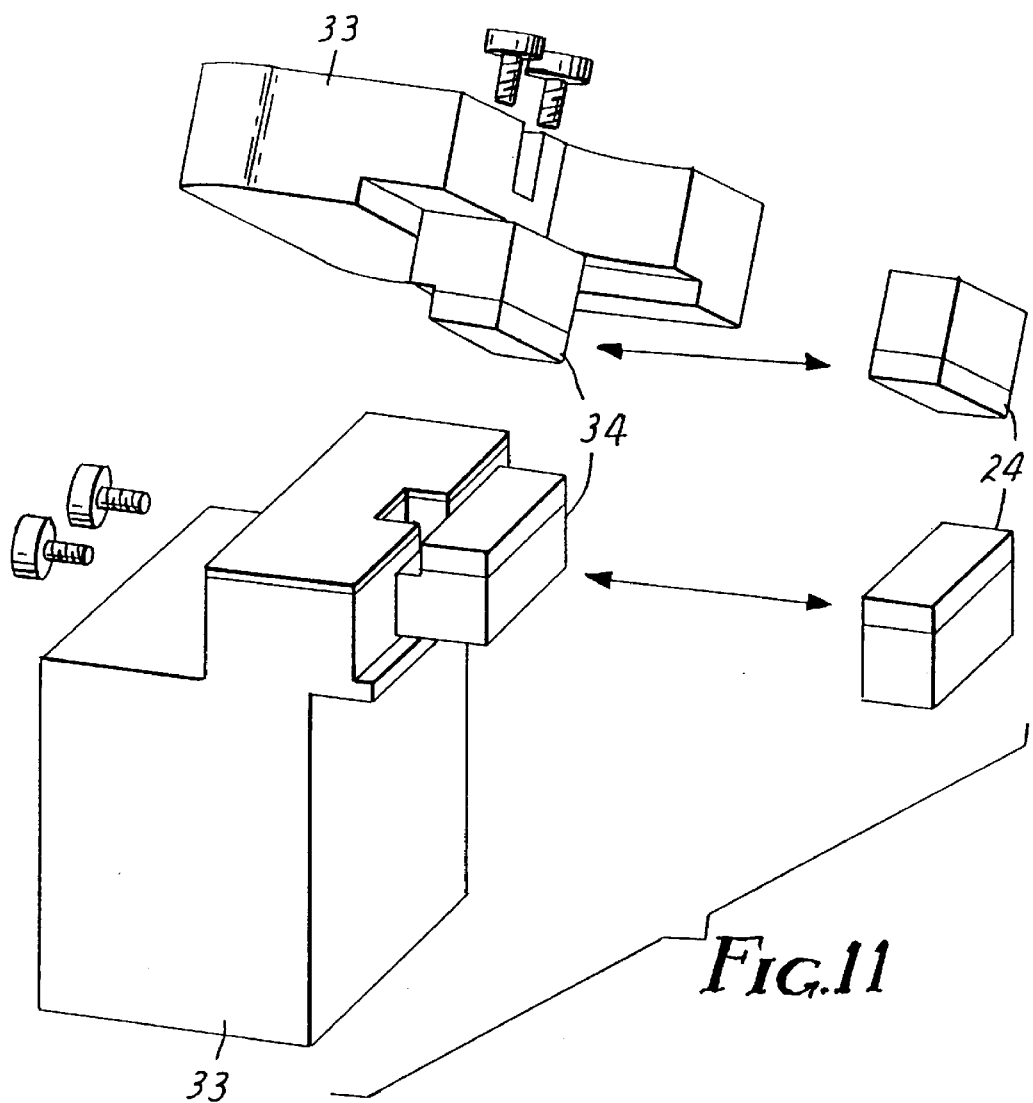

FIGS. 10, 11, and 12A–D illustrate the conversion kit, in accordance with the present invention. As shown in FIGS. 9 and 10, the Fujikura CT-0X series cleavers may be converted from square cleavers to curved-angled cleavers by replacing the hammer and one pair of clamping pads. The new components, by their design and placement, create the stresses necessary for curved-angled cleaving, set forth above with reference to FIGS. 5A–C, and 7A–C. Referring to FIGS. 10 and 11, the existing Fujikura cleaving hammer 28 is removed and replaced by cleaving hammer 38. Cleaving hammer 38 is held in place by mounting screw and washer 54, and is locked by locking set screws 56. As mentioned above, cleaving hammer 38, in accordance with the present invention, provides for a substantially concentrated bending force, $F_A$, instead of a distributed force, applied by the existing Fujikura cleaving hammer 28. Also, cleaving hammer 38 applies bending force, $F_A$, at a precise location as discussed above with reference to FIGS. 5A–C, 6A–C, and 7A–C Next, referring to FIG. 11, the existing Fujikura optical fiber clamping pads 24 are removed, and are replaced by optical fiber clamping pads 34, in accordance with the present invention. Clamping pads 34 are extended so as to provide the correct distance, $d_3$, between clamping pads 34 and 36 (also see FIGS. 5A and 7A). The distance $d_3$ between clamping pads 34 and 36 is less than the distance $d_2$ between clamping pads 24 and 26 (also see FIG. 3B). As previously discussed, for a given cleaving hammer force $F_A$, placing the clamping pads closer together will reduce the tension and bending stresses, but not change the shear stress. Shifting the clamping pads 34 also places them closer to flaw producing device 41 and cleaving hammer 38 (see also FIGS. 5A and 7A), and as previously explained, moving cleaving hammer 38 and flaw producing device 41 closer to clamping pads 34 creates higher shear stress at flaw 43.

In one embodiment of the conversion kit in accordance with the present invention, the cleaving hammer exerts a concentrated force, $F_A$, 0.75 millimeters away from flaw producing device 41. In other words, $d_4$=4.75 millimeters, and $d_5$=0.75 millimeters (see also FIGS. 5B, 5C, 7B, and 7C). In addition, clamping pads 34 are shifted 1.5 millimeters relative to existing clamping pads 24. In the existing Fujikura cleaver of FIG. 3B, distance $d_2$ between clamping pads 24 and 26 is equal to 11 millimeters. Therefore, when shifted clamping pads 34 are retrofitted to the cleaver, distance $d_3$ (see FIGS. 5A and 7A) is equal to 9.5 millimeters. With these modifications, it was determined that 98% of the cleaved fibers had a curved cleave angle, $c_2$, greater than 3.0° (see FIG. 8A). If used with an index matching grease, an angle of 3.0° will produce splices with back reflection better than −50dB, over temperatures ranging from −40° C. to +85° C.

Other embodiments of the conversion kit of the present invention will also produce good cleave angles. These other embodiments all involve the placement of the cleaving hammer, clamping pads, and flaw producing device in certain locations. In one alternative embodiment, the average cleave angle may be increased, and the need to replace existing clamping pads 24 with pads 34 may be eliminated. This is accomplished in the conversion kit by shifting the scoring wheel 29 a distance of 0.85 millimeters toward existing clamping pads 24. This is accomplished by placing a shim 0.85 millimeters in thickness to the left of scoring wheel 29, between the wheel and the carriage locating wall. There is a setscrew within the carriage assembly that may be loosened to allow placement of the shim, and then re-tightened. In addition, the existing pads 24 are shifted toward pads 26 a distance of 0.40 millimeters. This is also accomplished by placing shims 0.40 millimeters thick between the pads and their respective locating walls. The bottom pad is first removed by removing its mounting screws, and then replaced using the same screws, but with the shim placed between the pad and locating wall. The top pad is done in a similar manner, except new screws are required to allow the pad to shift 0.40 millimeters. In addition, the distributed cleaving force hammer 28 is also replaced with substantially concentrated cleaving force hammer 38, to apply a concentrated force, $F_A$, a distance of 1.0 millimeters from the scoring wheel's new position, so that the wheel 29 is between the hammer 38 and shifted pads 24. With these changes, $d_3$=10.6 millimeters, $d_4$=5.35 millimeters, and $d_5$=1.0 millimeters. With these modifications, it was determined that 98% of the cleaved fibers had a curved cleave angle, $C_2$, greater than 3.5 degrees.

The conversion kit has been described to provide curved-angle cleaving, in accordance with the present invention, and in order to permit users of pre-existing Fujikura cleavers to retrofit their cleavers without special tools or training. The described embodiments are not intended to limit other similar embodiments. In addition, the curved-angle cleaving method of the present invention may also be applied to create conversion kits for similar optical fiber cleavers, such as those manufactured by Sumitomo Electric Fiber Optics Corporation and The Furakawa Electric Co., Ltd.

The present invention may also be embodied in a new cleaver, without the need to retrofit an existing cleaver. Benefits of this would be to further enhance the performance and features of the cleaver of the present invention, beyond what is practical for a field-convertible conversion kit. However, many of the attributes of the invention described below may also be applied to a cleaver adapter kit that is more sophisticated than the kits described above.

A desirable feature of the cleaver of the present invention is the ease of switching between square or curved-angle cleaving. This is accomplished by providing cleaving hammer, clamping pad and flaw producing device positions that can be quickly changed for square or curved-angle cleaving. For curved-angle cleaving, the cleaving hammer provides a concentrated load at a location displaced from the fiber flaw produced by the flaw producing device as shown in FIGS. 4, 5A–C, 6A–D and 7A–C. For square cleaving, the hammer is adjusted to apply a distributed load centered over the flaw as shown in FIGS. 3A–F.

Figure 12A:
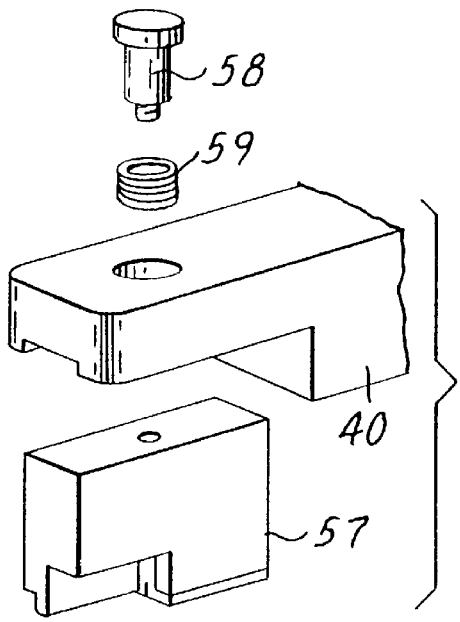
FIGS. 12A–D is an alternative embodiment of a cleaving hammer useable in the present invention.
Figure 12C:
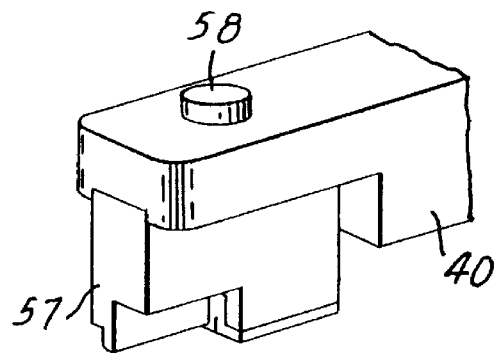
Figure 12B:
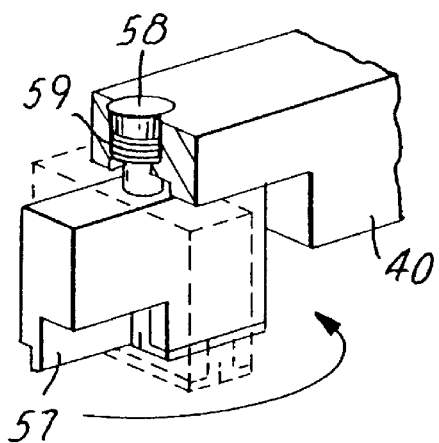
Figure 12D:
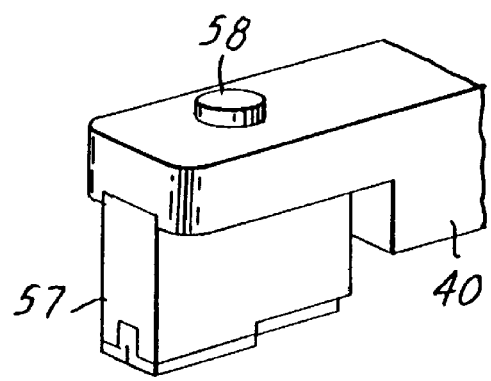

One method for providing cleaving hammer adjustability is through use of a rotating hammer, as shown in FIGS. 12A–D. Rotating hammer 57 is affixed to pivot arm 40 by threaded pin 58 that is biased by spring 59. In operation, as shown by FIG. 12B, depressing pin 58 compresses spring 59 and permits rotatable hammer 57 to rotate between the hammer position for curved-angle cleaving (shown in FIG. 12C), and the hammer position for square cleaving (shown in FIG. 12D).

In addition to the rotatable hammer, the clamping pads and/or flaw producing device may also be adjustable. In one embodiment of the invention, only the cleaving hammer and flaw producing device are adjustable, in which case the flaw producing device is centered between the clamping pads for square cleaving, and the hammer is shifted off center for angled cleaving, for example by rotating a rotatable hammer as shown in FIGS. 12A–D. The spacing between the clamping pads is a fixed distance of approximately 10 millimeters. The flaw producing device is shifted off center approximately 2.5 millimeters for curved-angle cleaving, with the hammer force being applied 1.0 millimeter away from the flaw produced by the flaw producing device. The flaw producing device may be made adjustable in any number of ways, including, for example, the use of a spacing shim that is engaged or disengaged, or by providing a shiftable carriage for the flaw producing device. When set for curved-angle cleaving, the following dimensions exist in this embodiment: $d_3$=10.0 millimeters, $d_4$=6.5 millimeters, and $d_5$=1.0 millimeter. Tests performed with this embodiment of the invention show that 95% of the cleave angles, $C_2$, are larger than 4.5° in the curved-angled cleave mode. If used with an index-matching grease, an angle of 4° will produce splices with back reflection better than −60dB, over temperatures ranging from −40° C. to +85° C.

In another embodiment of the invention, only the cleaving hammer and clamping pads are adjustable. This is similar in concept to the conversion kit of the present invention, except the clamping pads are shifted further for larger cleave angles, and the clamping pads and cleaving hammer are configured for easy conversion to and from square and curved-angle cleaving.

In this embodiment, the clamping pads are spaced 11 millimeters (distance $d_3$) apart for square cleaving with one pair of the pads being shiftable 3.0 millimeters (resulting in a distance $d_3$ of 8 millimeters) for curved-angle cleaving. For square cleaving, the flaw producing device is centered between the pads as shown in FIGS. 3A–F, but for angled cleaving, shifting the pads 3.0 millimeters would place the flaw producing device 1.5 millimeter off center as shown in FIGS. 5A–C and 7A–C. In square cleaving, the cleaving hammer provides a distributed load centered over the flaw producing device, as with the Fujikura cleaver of FIGS. 3A–F. For angled cleaving, the cleaving hammer is adjustable (as shown, for example, in FIGS. 12A–D), so that a substantially concentrated cleaving hammer force is located 0.75 millimeters from the flaw produced by the flaw producing device. The clamping pads may be made adjustable in any number of ways, including, for example, by sliding them within a track or by using spacing shims that are engaged or disengaged. When set for curved-angle cleaving, the following dimensions exist in this embodiment: $d_3$=8.0 millimeters, $d_4$=4.75 millimeters and $d_5$=0.75 millimeters.

In the embodiment described above, the space between the clamping pads is 8 millimeters for angled cleaving and 11 millimeters for square cleaving. By contrast, the clamping pad spacings in the preferred embodiment for the Fujikura cleaver retrofitted for angled cleaving are 9.5 and 11 millimeters. The 9.5 millimeter spacing results in smaller angles, but is necessary due to the method that the Fujikura cleaver uses to establish the proper flaw depth.

To establish the flaw depth, the Fujikura cleaver (FIGS. 3A and 3B) utilizes a scoring wheel 29 which is set at a precise height above the fiber 11. As the wheel 29 passes under the fiber 11, it deflects the fiber, creating a bending force which presses the wheel 29 into the fiber 11, creating a flaw 31. The closer the pad spacing, the stiffer the fiber 11, and the deeper the flaw 31, for a given wheel height. Therefore, the depth of the flaw 31 changes as the pad spacing changes. For the converted Fujikura angled cleaver, the flaw size is greater when the pad spacing is 9.5 millimeters than when it with the 11 millimeter spacing, but is still within the allowable tolerance. However, for a preferred embodiment of the invention described above, the change in spacing between the pads separated by 8 millimeters and 11 millimeters can cause the flaw size to vary by a large amount. Therefore, in another embodiment of the invention, the flaw size is not established by controlling the height of the flaw producing device. Instead, the force of the flaw producing device against the fiber may be created by a weight or spring-loaded device acting on the flaw producing device. In this way, the flaw size will be uniform regardless of pad spacing. The force may be adjustable, so that specialty fiber, such as titanium-clad fiber which requires a greater scoring force, may be cleaved.

Another advantage of the new cleaver is that it is better suited for providing keyed splicing. In keyed splicing, one fiber or a ribbon of an array of fibers is placed upside down, so that the angles mate in the orientation that produces the least longitudinal offset. For ease-of-use, the cleaver of the present invention may accept the 3M Multi-Fiber Splice Fiber Holder right-side up or upside down. Likewise, the cleaver may also accept the Fujikura, Sumitomo, and Furakawa ribbon holders right-side-up or upside down. Existing cleavers do not allow this, making keyed splicing more difficult.

Figure 13A:
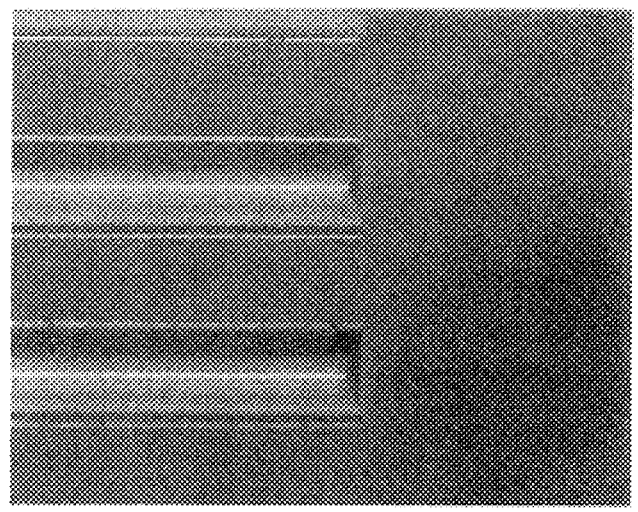
FIGS. 13A and B, 14A and B and 15A and B are photomicrographs of optical fibers cleaved according to the present invention.

FIGS. 13A and B, 14A and B, and 15A and B present magnified photographs of actual optical fibers cleaved, in accordance with the present invention. Each pair of photographs present side views and top views of curved-angle cleaved optical fibers, similar to the orientation shown in FIG. 8A and 8B.

Figure 13B:
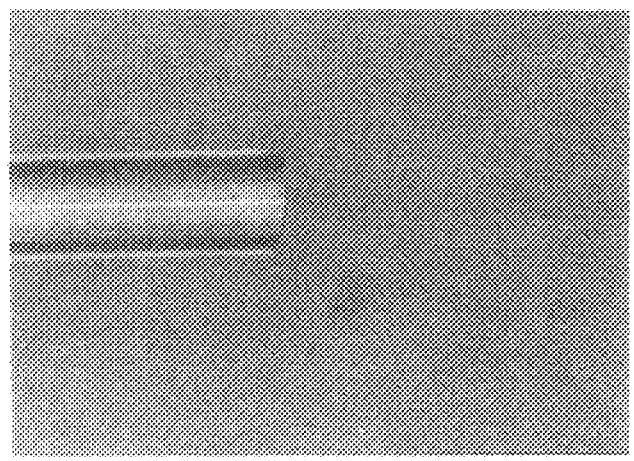

FIGS. 13A and 13B are each 100×magnifications of 125 micron curved-angle cleaved optical fiber, cleaved with a cleaver having dimensions $d_3$=9.75 millimeters, $d_4$=4.75 millimeters, and $d_5$=0.75 millimeters (see also FIGS. 5A–C and 7A–C). The cleave initiation angles were measured to be between 0.5° to 1°, and the cleave angle at the core of the optical fibers was measured at between 4° and 5°. In addition, the fibers exhibit a roll-off dimension of approximately 20 microns (16% of the diameter of the optical fiber).

Figure 14B:
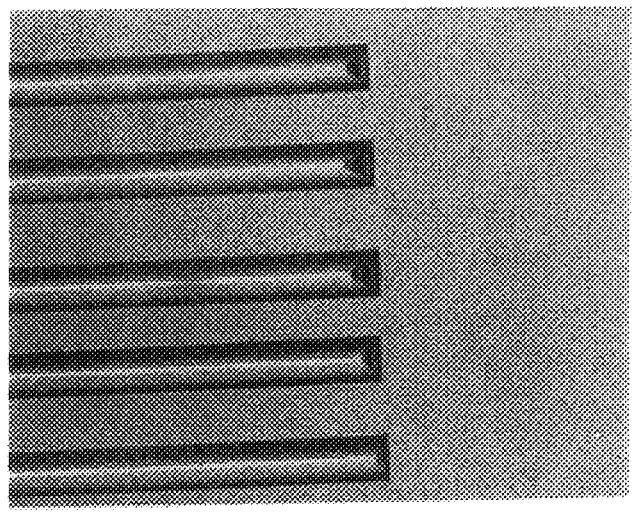
Figure 14A:
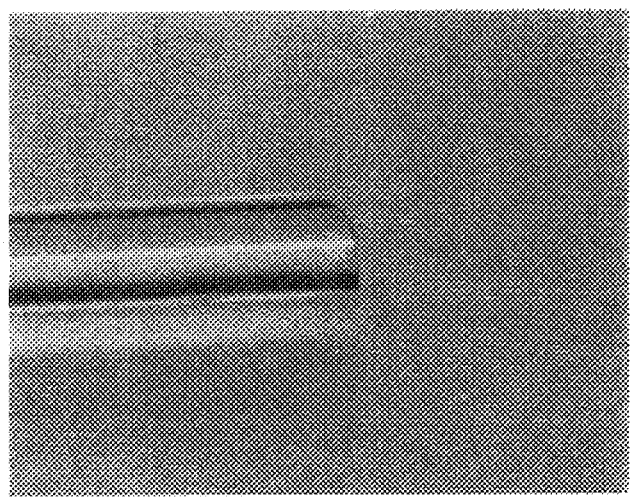

Referring now to FIGS. 14A and B shown are side views and top views of another optical fiber cleaved in accordance with the present invention. The magnification for FIG. 13A is 100×, and the magnification for FIG. 14B is 50×. The cleaver dimensions used to produce the cleaved fibers of FIGS. 14A and 14B were $d_3$=9.75 millimeters, $d_4$=7.5 millimeters, and $d_5$=0.75 millimeters. The cleave initiation angles were measured to be approximately 2°, and the cleave angle at the core of the optical fibers was approximately 8°. Roll-off dimensions varied between 40 and 75 microns (32%–60% of the diameter of the optical fiber).

Figure 15B:
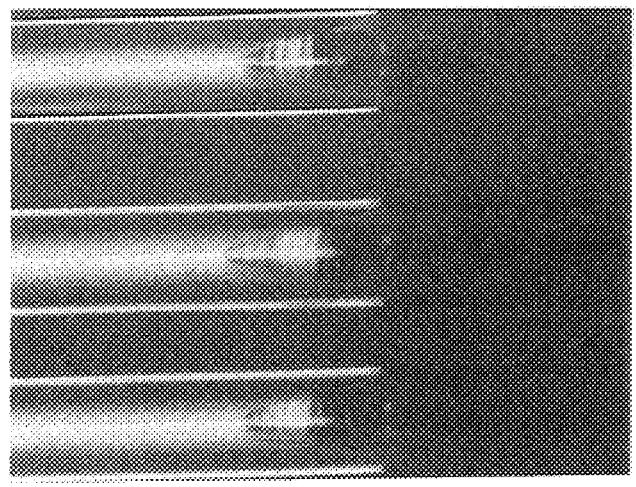
Figure 15A:
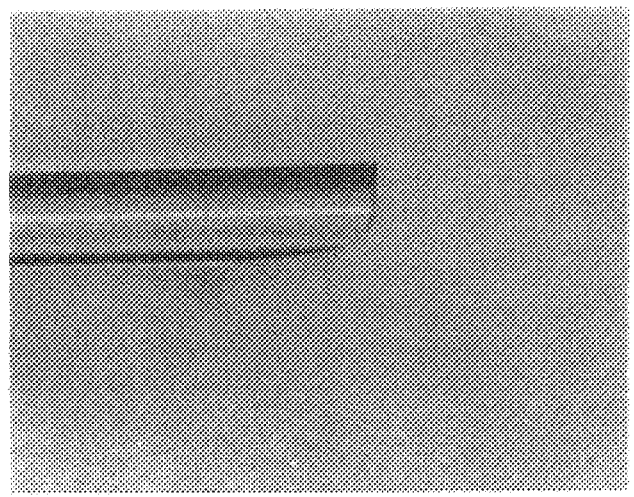

Finally, FIGS. 15A and 15B show a side views and top views of optical fibers (with 100×magnification), cleaved with a cleaver with the following dimensions: $d_3$=9.75 millimeters, $d_4$=8.25 millimeters, and $d_5$=0.75 millimeters. The fibers exhibit cleave angles at the core between 8° and 9°, which are comparable to the cleave angles shown in FIGS. 14A and 14B. However, the roll-off of dimensions are approximately 190 microns long (152% of the diameter of the optical fiber) and would likely result in inferior splices.

Therefore, while the curved-angle cleaved optical fibers of FIGS. 13A and 13B, and 14A and 14B are preferred, the extreme roll-off dimension exhibited by the fibers of FIGS. 15A and 15B would less preferable.

Although the present invention has been described with reference to certain embodiments, it will be understood to one of ordinary skill in this technology, that additions, deletions or changes may be made to the described embodiments, without departing from the spirit and scope of the present invention.

What is claimed is:

1. An apparatus for cleaving optical fiber, comprising:

first and second pairs of optical fiber clamps separated by a first predetermined distance;

a flaw producing device adapted to introduce a flaw in an optical fiber clamped in said clamps; and a force applying device adapted to apply a substantially concentrated cleaving force to said optical fiber at a second predetermined distance from said first pair of clamps, said flaw producing device being located between said force applying device and said second pair of optical fiber clamps at a third predetermined distance from said force applying device;

wherein said first predetermined distance is greater than said second predetermined distance which is greater than said third predetermined distance, said first, second and third predetermined distances having been selected to produce a curved-angle cleave in said optical fiber;

wherein said force applying device comprises a formed hammer; and wherein said formed hammer comprises a dual hammer piece, having a first hammer structure formed to apply a substantially concentrated force to said optical fiber displaced from said flaw to effect curved-angle cleaving of said optical fiber, and a second hammer structure formed to apply a distributed force to said optical fiber centered about said flaw to effect square cleaving of said optical fiber.

2. The apparatus of claim 1, said dual hammer piece being rotatable between first and second positions to place one of said first hammer structure and said second hammer structure in a position to apply force to said optical fiber.

3. The apparatus of claim 2, further comprising:

a pin attached to said dual hammer piece; and a spring cooperating with said dual hammer piece to bias said dual hammer piece into first and second nonrotating working positions, compression of said spring permitting said rotatable hammer piece to rotate about said pin between said first and second nonrotating working positions.

* * * * *